United States Patent
Wiatrowski et al.

(10) Patent No.: US 8,045,499 B2
(45) Date of Patent: Oct. 25, 2011

(54) METHOD OF COMMUNICATING WHICH CHANNEL IS TO BE MONITORED BY SUBSCRIBER UNITS THAT ARE IDLE IN A COMMUNICATION SYSTEM

(75) Inventors: David G. Wiatrowski, Woodstock, IL (US); Thomas B. Bohn, McHenry, IL (US); Dipendra M. Chowdhary, Hoffman Estates, IL (US); Satish R. Panpaliya, Palatine, IL (US); Tejal S. Patel, Schaumburg, IL (US); Badarinath Patibandla, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 500 days.

(21) Appl. No.: 12/331,137

(22) Filed: Dec. 9, 2008

(65) Prior Publication Data
US 2010/0085952 A1    Apr. 8, 2010

Related U.S. Application Data

(60) Provisional application No. 61/102,791, filed on Oct. 3, 2008, provisional application No. 61/114,408, filed on Nov. 13, 2008.

(51) Int. Cl.
*H04B 7/14*    (2006.01)
*H04B 7/00*    (2006.01)
*H04Q 7/28*    (2006.01)
*H04Q 7/20*    (2006.01)

(52) U.S. Cl. .......... 370/315; 370/341; 370/352; 455/15; 455/450; 455/512

(58) Field of Classification Search .......... 370/241–529; 455/11.1, 63.1, 15–515; 709/232–236
See application file for complete search history.

(56) References Cited

U.S. PATENT DOCUMENTS

| | | | |
|---|---|---|---|
| 5,287,551 A | 2/1994 | Gustafson, Jr. et al. | |
| 5,329,558 A | 7/1994 | Larsson et al. | |
| 5,724,515 A * | 3/1998 | Barnes et al. ................. | 709/236 |
| 5,734,643 A * | 3/1998 | Rondeau ....................... | 370/279 |
| 5,761,211 A | 6/1998 | Yamaguchi et al. | |

(Continued)

FOREIGN PATENT DOCUMENTS

KR    10-0349664 B1    8/2002

(Continued)

OTHER PUBLICATIONS

PCT International Search Report Dated Apr. 15, 2010.

(Continued)

*Primary Examiner* — Afsar M. Qureshi
(74) *Attorney, Agent, or Firm* — Terri S. Hughes; Daniel R. Bestor

(57) ABSTRACT

The present invention discloses, in a two-way radio frequency (RF) communications system having at least one repeater, a plurality of channels, and a plurality of subscriber units, a repeater receives a message that identifies a channel that is selected to serve as a rest channel for the system. The channel that is currently serving as the rest channel for the system is monitored by subscriber units that are idle in the system. If the repeater determines that the channel selected to serve as the rest channel is hosted by the repeater, the repeater periodically transmits an identity of the channel as the channel currently serving as the rest channel on at least the channel.

18 Claims, 14 Drawing Sheets

U.S. PATENT DOCUMENTS

| | | | |
|---|---|---|---|
| 6,052,562 | A | 4/2000 | Dorenbosch |
| 7,203,207 | B2 | 4/2007 | Hiben |
| 7,499,441 | B2 | 3/2009 | Wiatrowski et al. |
| 2002/0173311 | A1* | 11/2002 | Biggs et al. .................. 455/450 |
| 2003/0153319 | A1 | 8/2003 | Wieczorek et al. |
| 2005/0070320 | A1 | 3/2005 | Dent |
| 2005/0153666 | A1 | 7/2005 | Nguy et al. |
| 2005/0174963 | A1 | 8/2005 | Hsu |
| 2006/0221887 | A1 | 10/2006 | Newberg |
| 2006/0234748 | A1 | 10/2006 | Baik |
| 2007/0104139 | A1 | 5/2007 | Marinier et al. |
| 2007/0129079 | A1 | 6/2007 | Schwarz et al. |
| 2007/0275756 | A1 | 11/2007 | Choi |
| 2008/0008153 | A1 | 1/2008 | Hiben et al. |
| 2008/0219191 | A1 | 9/2008 | Wang et al. |
| 2008/0225821 | A1 | 9/2008 | Faith |
| 2009/0016283 | A1 | 1/2009 | Zhang et al. |
| 2010/0303033 | A1 | 12/2010 | Shahar et al. |
| 2011/0026514 | A1 | 2/2011 | Tay |

FOREIGN PATENT DOCUMENTS

| | | | |
|---|---|---|---|
| KR | 10-2008-0021454 A | 3/2008 | |

OTHER PUBLICATIONS

Sang Hyun Park, Corresponding Application PCT/US2009/058545—PCT International Search Report and Written Opinion, WIPO, ISA/KR, Korean Intellectual Property Office, Daejeon, Republic of Korea, Apr. 30, 2010, 11 pages, most relevant pp. 6-7 and 10-11. For related U.S. Appl. No. 12/331,180.

Choon Geun Cho, "Corresponding Application PCT/US2009/058326—PCT International Search Report and Written Opinion," WIPO, ISA/KR, Korean Intellectual Property Office, Daejeon, Republic of Korea, May 10, 2010, 10 pages, most relevant pp. 6-7 and 10. For related U.S. Appl. No. 12/331,189.

Jung Pil Seung, "Corresponding Application PCT/US2009/058550—PCT International Search Report and Written Opinion," WIPO, ISA/KR, Korean Intellectual Property Office, Daejeon, Republic of Korea, Apr. 30, 2010, 10 pages, most relevant pp. 6-7 and 10. For related application U.S. Appl. No. 12/331,167.

International Preliminary Report on Patentability dated Apr. 14, 2011 in counterpart application PCT/US2009/058548.

Office Action dated May 27, 2011 in related U.S. Appl. No. 12/331,180.

Ahmed Sobeih et al. "Almost Peer-to-Peer Clock Synchronization", University of Illinois-IBM T.J. Watson Research Center; IEEE 2007, 10 pages.

International Preliminary Report on Patentability dated Apr. 14, 2011 in related case PCT/US2009/058326.

PCT International Search Report and Written Opinion Dated Apr. 14, 2011 for Related Application PCT/US2009/058550 (U.S. Appl. No. 12/331,167).

Office Action for Related U.S. Appl. No. 12/331,155.

* cited by examiner

METHOD OF COMMUNICATING WHICH CHANNEL IS TO BE MONITORED BY SUBSCRIBER UNITS THAT ARE IDLE IN A COMMUNICATION SYSTEM

FIELD OF THE DISCLOSURE

The present invention relates generally to two-way wireless trunked communication systems.

CROSS-REFERENCE TO RELATED APPLICATIONS

This application is commonly owned by Motorola, Inc. and concurrently filed with the following U.S. Patent Applications:

Ser. No. 12/331,180, titled "Method for Trunking Radio Frequency Resources," which is incorporated herein by reference in its entirety;

Ser. No. 12/331,189, titled "Method of Efficiently Synchronizing to a Desired Timeslot in a Time Division Multiple Access Communication System," which is incorporated herein by reference in its entirety;

Ser. No. 12/331,167, titled "Method for Selecting a Channel to be Monitored by Subscriber Units that are Idle in a Communication System," which is incorporated herein by reference in its entirety; and Ser. No. 12/331,155, titled "Method for Ending a Call Session in a Communications System," which is incorporated herein by reference in its entirety.

BACKGROUND OF THE DISCLOSURE

Many varieties of trunked two-way radio communications systems are known in the art. FIG. 1 is a block diagram illustrating both a typical conventional radio system 101 and a trunked radio system 103. In the conventional radio system 101, a plurality of subscriber units are formed into talkgroups. Each talkgroup uses separate channels for communication. Thus, each talkgroup is served by one channel. In contrast, the trunked radio system 103 and its subscriber units use a pool of channels for virtually an unlimited number of talkgroups. Thus, all talkgroups are served by all channels. The trunked radio system 103 works to take advantage of the probability that not all talkgroups need a channel for communication at the same time. Estimates are made about how much load a typical user presents to the system in terms of calls per hour and duration of each call. For a traffic load, fewer channels are required since all talkgroups are served by all channels. Combining this with the number of users on the system, and the acceptable quality of service (QoS), determines how many trunked channels are required to satisfactorily serve the number of users. With a given number of channels, a much greater number of talkgroups can be accommodated as compared with conventional radio systems. Hence, a primary purpose of a trunked radio system is the efficient utilization of channels allowing for more users to carry many conversations over a fewer number of distinct channels.

As seen in FIG. 2, a trunked radio system can be either a centralized trunked radio system 201 or a decentralized trunked radio system 203. A centralized trunked radio system 201 uses a dedicated or exclusive channel, which is often referred to as a control channel, for communication between subscriber units and a central controller 205. Other terms that sometimes refer to the central controller 205 include trunking controller, site controller, resource allocator, channel allocator, controller, and other like terms. The subscriber units constantly monitor the control channel for channel assignment instructions. In order to start a group call (i.e., a one-to-many call), a subscriber unit requests that a channel is allocated for its use, and the central controller 205 transmits instructions telling the subscriber units in the group to switch to a traffic channel assigned for that call. A similar process is followed when a subscriber unit starts an individual call (i.e., a one-to-one call).

A decentralized trunked radio system 203, however, does not require the use of an exclusive channel. The intelligence or control function for assignment of a channel to a call remains in the subscriber units. Thus, the decentralized trunked radio system 203 can co-exist with conventional users on the same channels without the use of the control channel. When a call is initiated by a subscriber unit, the channel assignment is determined by the logic in subscriber units, not by a controller. In operation, a subscriber unit scans the channels, finds an idle channel and starts a call on the idle channel. The disadvantage of the decentralized trunked radio system 203 is that the scan to find an idle channel significantly increases the access time, which often provides for unacceptably high latency delays during call set up.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
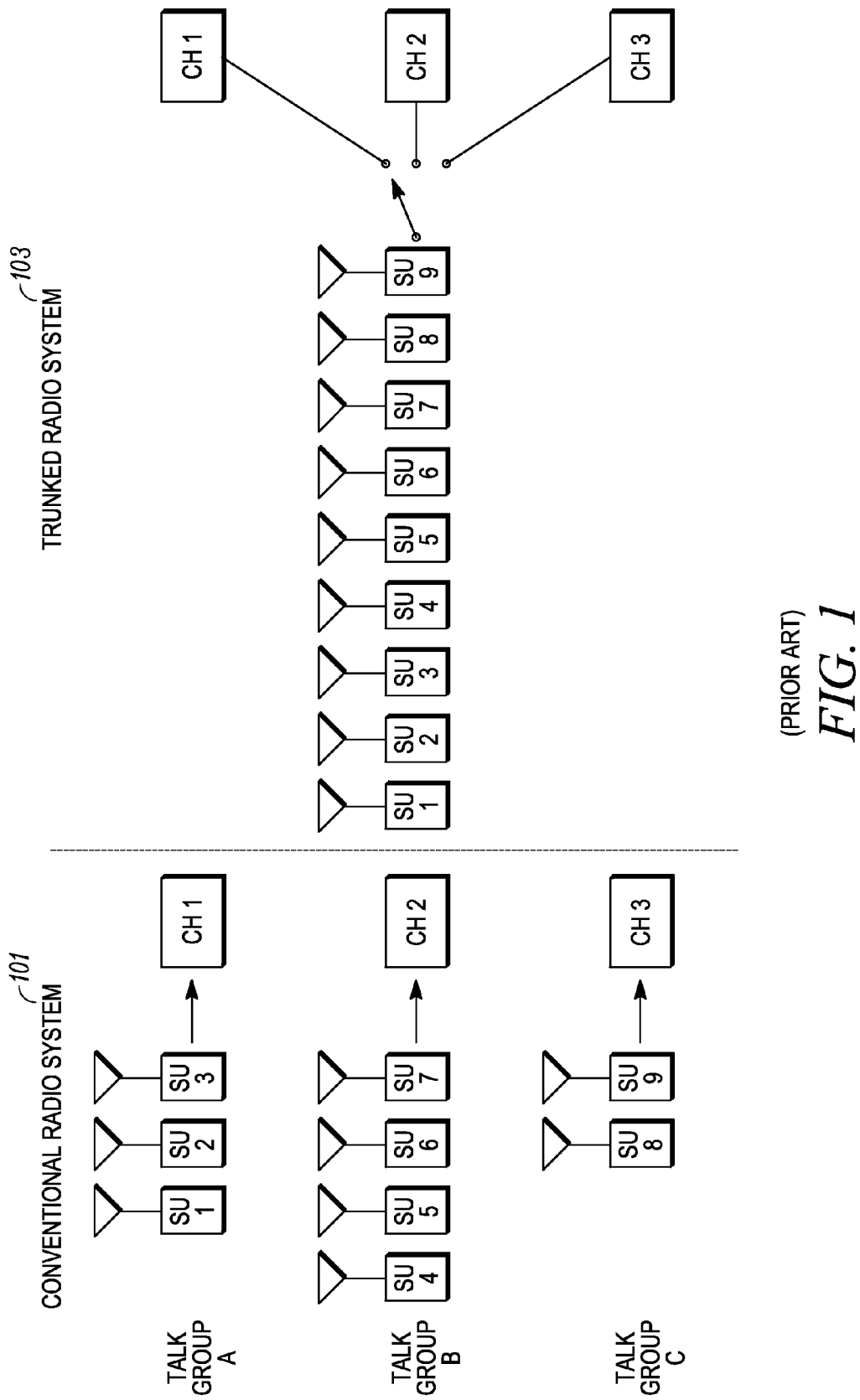
FIG. 1 is a prior art block diagram illustrating both a conventional radio system and a trunked radio system.
Figure 2:
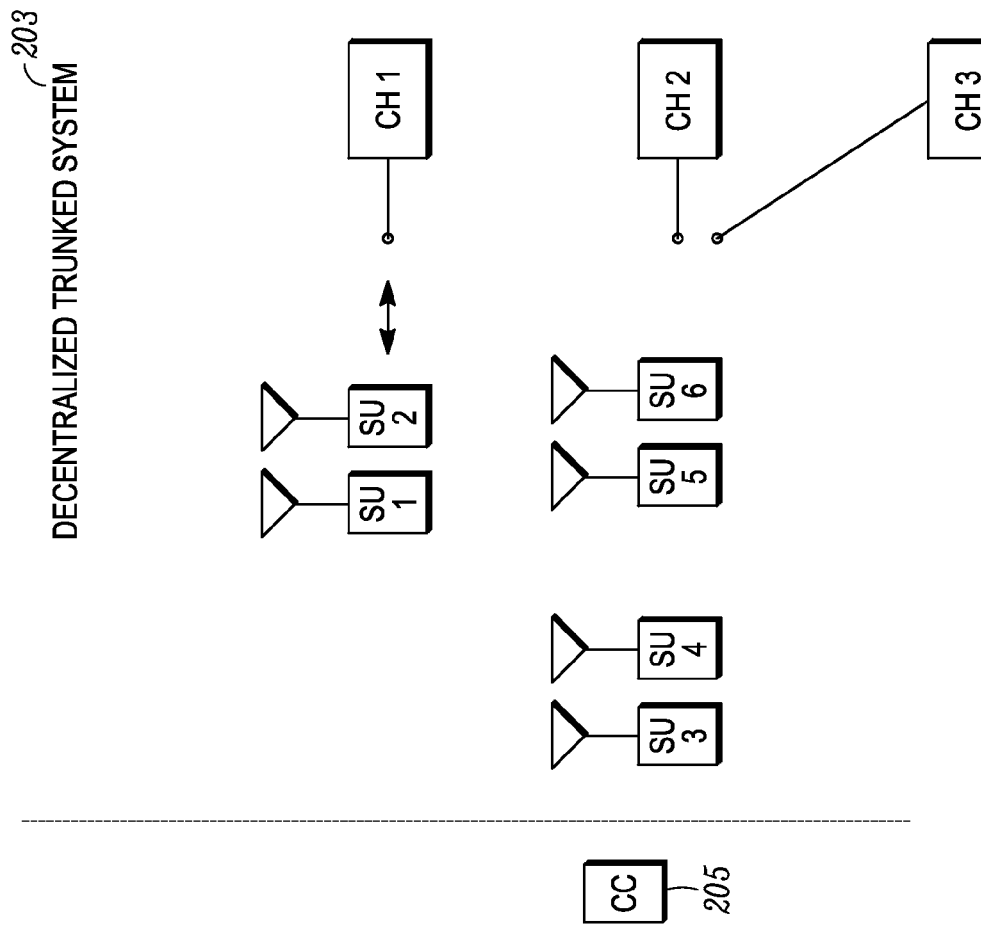
FIG. 2 is a prior art block diagram illustrating a centralized trunked radio system and a decentralized trunked radio system.
Figure 2:
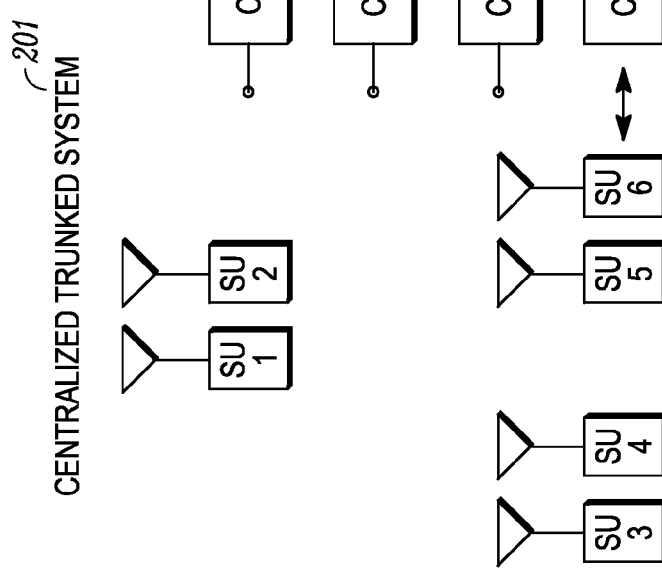

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DISCLOSURE

The present invention discloses, in a two-way radio frequency (RF) communications system having at least one repeater, a plurality of channels, and a plurality of subscriber units, a repeater receives a message that identifies a channel that is selected to serve as a rest channel for the system. The channel that is currently serving as the rest channel for the system is monitored by subscriber units that are idle in the system. If the repeater determines that the channel selected to serve as the rest channel is hosted by the repeater, the repeater periodically transmits an identity of the channel as the channel currently serving as the rest channel on at least the channel.

The present disclosure also provides for polite interaction between a trunked system's repeaters and co-channel repeaters that may be present in the geographical vicinity of each other. A co-channel repeater operates by sharing at least some RF spectrum with the trunked repeater or the data repeater. The co-channel repeater is geographically positioned such that transmissions from the trunked repeater or data repeater and the co-channel repeater are likely to mutually interfere with one another. Typically, regulatory rules require a repeater to stop transmitting when it is not repeating payload traffic on behalf of its system's users. The regulatory rules typically further prohibit a subscriber unit belonging to one system from transmitting when a subscriber unit belonging to a co-channel system is already transmitting. It is these regulatory rules that make a continuously keyed control channel of a centralized trunked radio system infeasible for system operators that are not able to obtain a license granting exclusive use of a segment of RF spectrum. Thus, the present disclosure addresses this critical need.

One aspect of the present disclosure is embodied in a system for trunked RF resources. The RF resources being shared are sometimes also referred to as channels. A channel in a frequency division multiple access (FDMA) system comprises a frequency, while a channel in a time division multiple access (TDMA) system comprises a frequency and a timeslot, and a channel in a code division multiple access (CDMA) system comprises a frequency and a code. The configuration of the present disclosure offers the advantages of both a centralized and decentralized trunked radio system by providing a call access time faster than a centralized trunked radio system, but does not require an exclusive control channel. A principal difference between the present disclosure as described herein and both centralized and decentralized trunked radio systems is that the present disclosure does not assign a channel to a call, but rather assigns a channel to the subscriber units that are idle in the system. Let us now refer to the figures that describe the present disclosure in greater detail.

Figure 3:
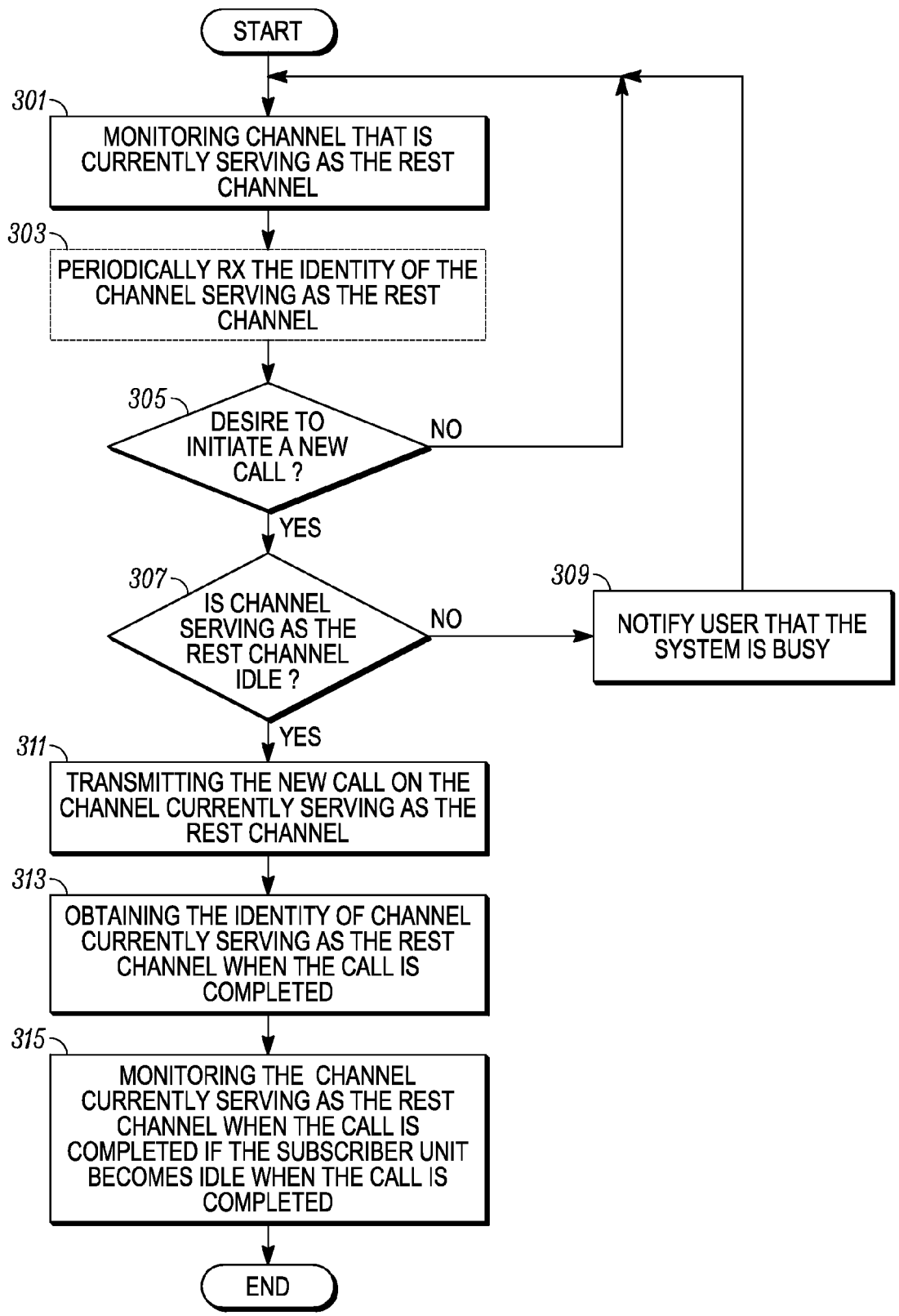
FIG. 3 is a flowchart illustrating a process used by a subscriber unit to initiate a call in a radio communications system in accordance with an embodiment of the present disclosure.

FIG. 3 is a flowchart illustrating a process used by a subscriber unit during initiation of a communication or call in a two-way RF communication system having at least one repeater, a plurality of channels, and a plurality of subscriber units. In operation, the subscriber units that are idle (i.e., neither transmitting nor receiving) in the system are monitoring a first channel that is currently serving as a rest channel at step 301 until it desires to initiate a call. The channel currently serving as the rest channel is typically an idle channel, but that may not necessarily be the case, particularly when all channels in the system that are eligible to serve as the rest channel are busy (i.e., being used for communications). Eligibility requirements for a channel to serve as the rest channel are described in more detail below.

The subscriber unit monitoring the channel currently serving as the rest channel may periodically receive the identity of the channel currently serving as the rest channel at step 303. Since channels may be shared with one or more co-channel users, where co-channel users are entities that share at least some RF spectrum in at least a partially overlapping geographic area, the repeater hosting the channel currently serving as the rest channel is not permitted to transmit, i.e., "to be keyed", for the sole purpose of continuously broadcasting system information as performed by a purely centralized trunked radio system. Instead, the repeater that is hosting the channel currently serving as the rest channel periodically transmits a beacon signal that indicates to the subscriber units the presence and location of the channel currently serving as the rest channel. Optionally, other information describing the status of at least some of the other channels in the system is also periodically transmitted (e.g., status of all channels in the system, status of only the channels in the system that have an active call, etc.). In one embodiment, the repeaters use a backend network for inter-repeater communication to share status information amongst each other, such as a wired local area network (LAN) connected to each repeater, however, the present disclosure is not limited to such a configuration. It will be recognized that the repeaters can communicate over the LAN using, for example, User Datagram Protocol over Internet protocol (UDP/IPv4).

When a subscriber unit desires to initiate a new call at step 305, the subscriber unit determines whether the channel currently serving as the rest channel is idle at step 307. If the channel currently serving as the rest channel is not idle, the subscriber unit may optionally notify the user that the system is busy at step 309, and return to step 301 to repeat the process. In the example illustrated in FIG. 3, the subscriber unit is only allowed to transmit its call on the channel currently serving as the rest channel if the channel is idle. Thus, if the channel currently serving as the rest channel is busy, then the subscriber unit waits for the channel to become idle, or waits until a new channel is selected to serve as the rest channel that is idle. It should be noted, however, that in other embodiments, the subscriber unit may be allowed to transmit its call even if the channel currently serving as the rest channel is not idle, for example, based on preemptive rights or priority rankings of the subscriber unit currently transmitting a call and the subscriber unit desiring to transmit a call.

If, however, the subscriber unit determines that the channel currently serving as the rest channel is idle at step 307, the subscriber unit transmits the new call on the channel currently serving as the rest channel at step 311. Thus, assignment of a channel to a call is always implied or performed before the call is requested. Since the channel is implied, a subscriber unit does not need to request a channel to start a call as required in the prior art trunked radio system, thus improving the access time and eliminating the need for a dedicated control channel, as required in a centralized trunked radio system.

Upon the start of the new call, the first channel changes its status from currently serving as the rest channel to a traffic channel, and a second channel in the system is selected to serve as the rest channel for the system. Thus, the first channel transitions into a traffic channel when the new call starts, and the second channel transitions into serving as the rest channel for the system to be monitored by subscriber units that are idle in the system when the new call starts. It is important to note, that in some embodiments, only one channel serves as the rest channel for the system at any given time, however, the present disclosure is not limited to such (i.e., more than one channel may serve as the rest channel). For ease of explanation, the present disclosure assumes that only one channel can serve as the rest channel at any given time, unless otherwise indicated. It is also important to note that the channel currently serving as the rest channel for the system may change often (e.g., potentially with the start of every new call).

Referring back to FIG. 3, the subscriber unit continues to transmit the new call on the first channel until the new call is completed. Once the new call is completed (e.g., after the call hang time (i.e., the predetermined time period after the call is completed when the repeater remains in a transmit mode (in a keyed or transmitting state)) and reserves the channel for use by subscriber units participating in the call that was most recently using the channel), the subscriber unit obtains the identity of the channel currently serving as the rest channel at the time the call is completed at step 313. Optionally, the subscriber unit may also obtain other information describing the status of at least some of the other channels in the system, for example, whether a channel is idle or processing a call, and the target identifier (e.g., talkgroup identifier or individual subscriber unit identifiers) that is active on each of the channels in the system that is processing a call, if applicable. Thus, the subscriber unit may leave the first channel after the new call is completed and tune to either the second channel currently serving as the rest channel, if the subscriber unit becomes idle when the call is completed, at step 315 or tune to a channel where a call of interest is active.

Figure 4:
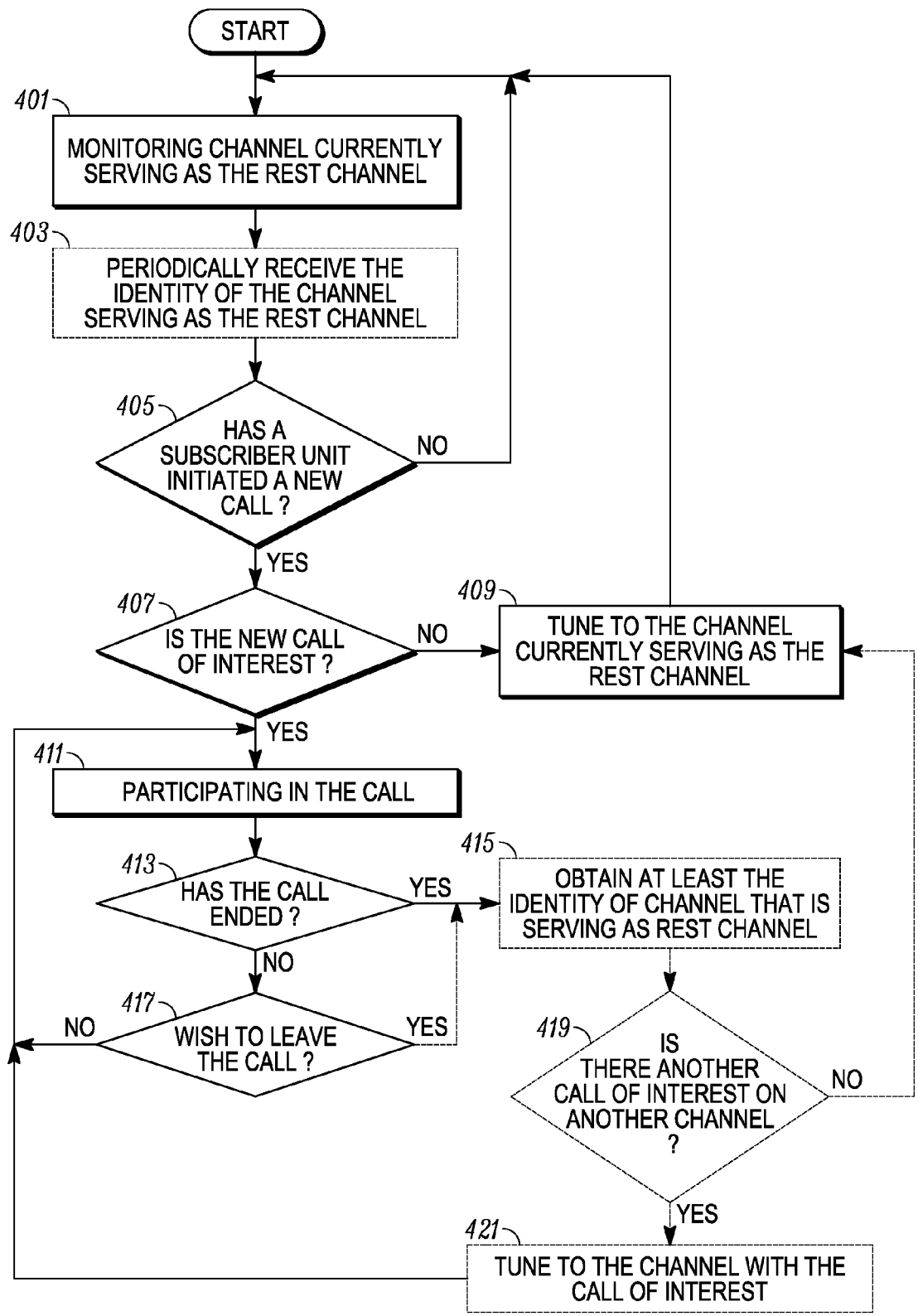
FIG. 4 is a flowchart illustrating a process used by a subscriber unit that is idle and tuned to a channel serving as a rest channel in a radio communications system in accordance with an embodiment of the present disclosure.

Now let us describe the perspective of the subscriber unit that is idle when the first subscriber unit initiates the first call with reference to FIG. 4. In operation, the subscriber units that are idle in the system are monitoring the first channel that is currently serving as the rest channel, at step 401, at least until the subscriber unit determines that a new call is being initiated on the channel. Each subscriber unit monitoring the first channel may periodically receive the identity of the channel currently serving as the rest channel, as noted above, at step 403. This ensures that the subscriber units know that they are still monitoring the channel currently serving as the rest channel for the system.

When the subscriber unit determines that one of the plurality of subscriber units initiated a new call on the channel currently serving as the rest channel at step 405, it further determines whether the new call is of interest to the subscriber unit at step 407. If the subscriber unit determines that the new call is not of interest at step 407, the subscriber unit ceases monitoring the first channel and tunes to a second channel that was selected to replace the first channel as the rest channel when the first call started at step 409, and repeats the process by monitoring the channel currently serving as the rest channel at step 401, in this instance, the second channel. In one embodiment, each subscriber unit monitoring the first channel receives the identity of the second channel that was selected to serve as the rest channel when the new call starts on the first channel. In this embodiment, the second channel replaces the first channel to serve as the rest channel when the first channel transitions to a traffic channel at the start of the new call. In other embodiments, however, each subscriber unit learns the identity of the second channel serving as the rest channel by other means (e.g., detecting a specific synchronization pattern). Again, once tuned to the second channel, the subscriber unit periodically receives the identity of the channel currently serving as the rest channel for the system at step 403, and repeats the process flow. The subscriber units may also receive other information describing the status of at least some of the channels in the system while monitoring the channel currently serving as the rest channel.

If, however, the first call is of interest to the subscriber unit at step 407, the subscriber unit participates in the first call on the first channel at step 411. When the call ends at step 413, the subscriber unit may receive the identity of the channel currently serving as the rest channel at step 415 and may tune to the channel currently serving as the rest channel at step 409 if it becomes idle after the call ends.

In some embodiments, the identity of the channel currently serving as the rest channel may also be periodically received during the call on the first channel. Receipt of the identity of the channel currently serving as the rest channel received periodically during the call allows the subscriber unit to easily tune to the channel currently serving as the rest channel for the system if it determines to leave the call before the call ends (e.g., the call is no longer of interest to the subscriber unit) at step 417. Thus, if the subscriber unit does not wish to leave the call before it ends, it continues to participate in the call at step 411. If, however, the subscriber unit does wish to leave the call before it ends at step 417, it may obtain the identity and tune to the channel currently serving as the rest channel at steps 415 and 409.

Optionally, the subscriber units may also receive other information describing the status of at least one other channel in the system as well, during the call and/or after the call ends. Such information allows a subscriber unit the opportunity to leave its current call and either participate in a different call of interest or higher priority, or become idle and monitor the channel currently serving as the rest channel. For example, the subscriber unit participating in the call on the first channel may receive, during the call and/or after the call ends, notification of a new call that is starting on another channel in the system, including the channel currently serving as the rest channel. If there is another call of interest on another channel at step 419, the subscriber unit may tune to the channel with the call of interest at step 421; otherwise, it may simply become idle and tune to the channel currently serving as the rest channel at step 409, or remain on its current call, if still in progress.

Notification of the channel currently serving as the rest channel during the first call also allows a subscriber unit to leave the call it is currently participating in and initiate a new call. Under this scenario, a subscriber unit participating in a call that desires to transmit a call of its own ceases participation in the current call, tunes to the channel currently serving as the rest channel, and follows the process flow described above with reference to FIG. 3, starting at step 301.

Let us now describe an optional embodiment for a radio communications system with enhanced data capability. A RF communications system with enhanced data capability operates to move data destined to a centralized data application server off of the trunked radio channels and onto a set of channels dedicated to transporting data. This process is advantageous because some types of data (e.g., geographic location tracking data) can present a very high load to a system that can make it difficult for a subscriber unit to obtain a channel for use with a voice call. This offers a high degree of frustration to the user because voice calls are typically more time sensitive than data messages. When a user requests a voice call, the typical expectation is that it is serviced nearly immediately. When data is required to be transmitted, however, it is often acceptable to slightly delay the transmission of the data while the subscriber unit waits for a channel to become available. The present disclosure addresses the time sensitivity of a voice call by optionally dividing the system into two distinct pools of repeaters: trunked repeaters and data repeaters. Each pool of repeaters may be sized equally or differently to provide a desired QoS based on the anticipated loading of voice traffic and data traffic.

Figure 5:
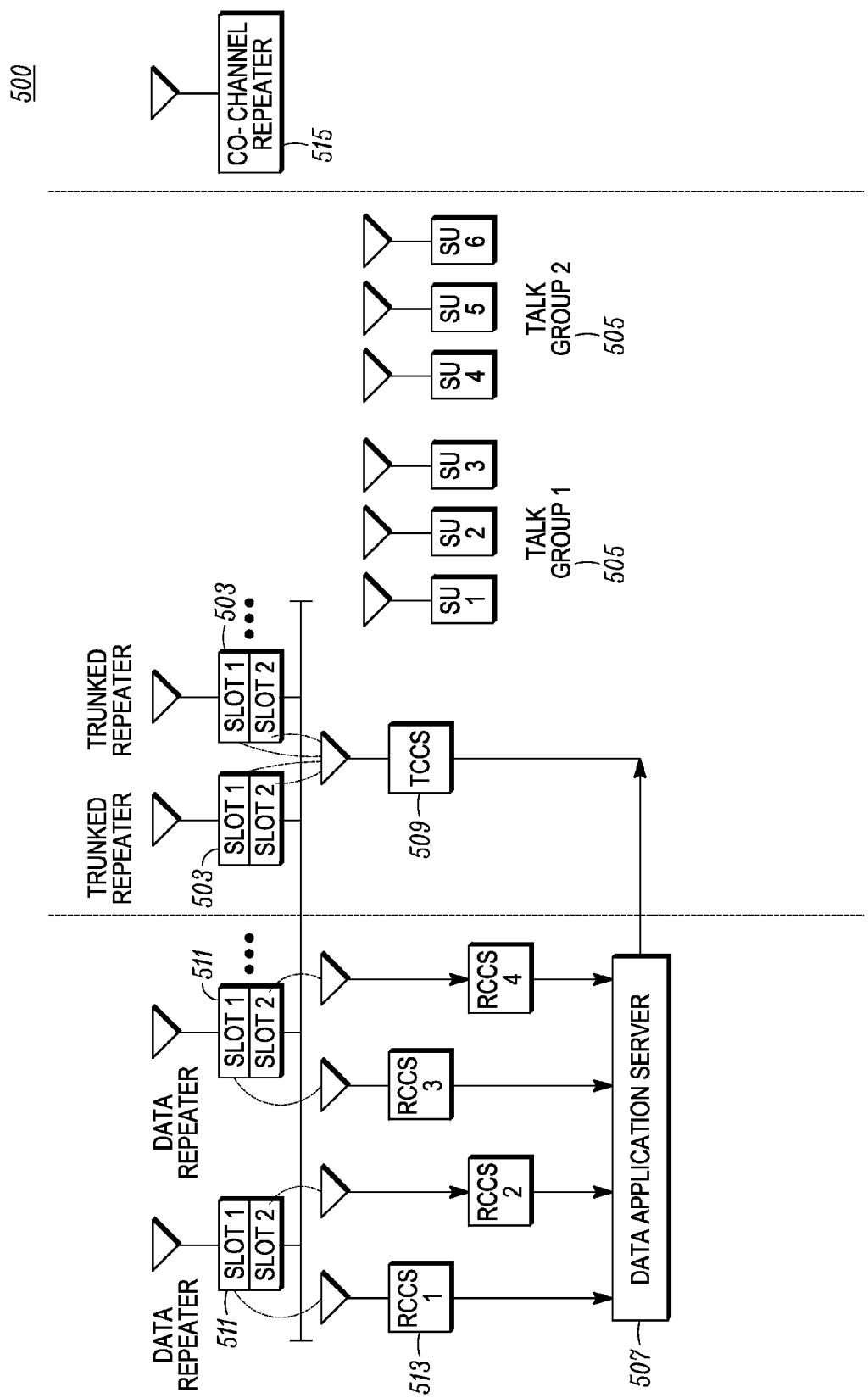
FIG. 5 is a block diagram illustrating a radio communications system with enhanced data capability in accordance with an embodiment of the present disclosure.

In detail, FIG. 5 illustrates an example of a radio communications system 501 with enhanced data capability in accordance with an embodiment of the present disclosure. The system 501 may comprise at least one trunked repeater 503 and subscriber units belonging to one or more talkgroups 505. The system 501 may additionally comprise a data application server 507, at least one trunked channel control station (TCCS) 509, at least one data repeater 511, and at least one revert channel control station (RCCS) 513. The trunked repeater 503 may operate to handle all voice calls, all control signaling block (CSBK) control calls, unit-to-unit data calls, unit-to-group data calls, data application server-to-unit data calls, and data application server-to-group data calls. The data repeater 511 may operate to handle all unit-to-data application server data calls. The data application server 507 may operate as a computer for hosting the data applications for the system 501, such as location tracking, text message, presence, and/or telemetry.

To facilitate reception of data communications from the subscriber units, SU1-SU6, to the data application server 507, at least one RCCS 513 per data repeater channel is installed and connected to the data application server 507. Each RCCS 513 present in the system is configured to operate on only its associated data repeater channel. While the primary function of the RCCS 513 is to receive inbound data from the subscriber units, SU1-SU6, when confirmed data signaling is used, the RCCS 513 supplies the appropriate open system interconnection (OSI) layer 2 or data link layer response, such as acknowledgement (ACK), negative acknowledgement (NAK), or selective automatic repeat request (SARQ), and manages the layer 2 confirmed delivery and packet reassembly processes that are well known in the art. To facilitate the transmission of data communications from the data application server 507 to the subscriber units, SU1-SU6, the TCCS 509, which may operate as a trunked subscriber unit, is installed and connected to the data application server 507. While the primary function of the TCCS 509 is to transmit outbound data to the subscriber units, SU1-SU6, when confirmed data signaling is used, the TCCS 509 waits to receive the appropriate OSI layer 2 response (e.g., ACK, NAK, or SARQ), and manages the layer 2 confirmed delivery and packet fragmentation processes that are well-known in the art.

It should also be noted, that in some system configurations, data directed to the data application server 507 may take place using the trunked repeater 503, in which case the system has no data repeaters 511. In this case, at least one RCCS 513 per trunked repeater channel is installed and connected to the data application server 507. Each RCCS 513 is configured to operate on only its associated trunked repeater channel. This configuration is less preferred on systems with a high data load, but may be acceptable for systems with a lower data loading.

Thus, in operation, in a two-way RF communications system having at least one repeater, a plurality of channels, and a plurality of subscriber units, a subscriber unit monitors a first channel that is currently serving as a rest channel for the system. As noted above, the channel currently serving as the rest channel is monitored by subscriber units that are idle in the system. When a subscriber unit desires to transmit a call, the subscriber unit determines if the call is a server-based data call. If not, the subscriber unit follows the process flow described above in FIG. 3, starting at step 307. If, however, the call is a server-based data call, the subscriber unit selects a second channel to transmit the server-based data call from a group of channels dedicated to handle server-based data calls, and begins transmitting the sever-based data call on the second channel.

Once the server-based data call ends, depending on the system design, the subscriber unit may return to the first channel that was serving as the rest channel for the system prior to the server-based data call. Alternatively, once the server-based data call ends, the subscriber unit may receive at least an identity of a third channel currently serving as the rest channel when the server-based data call ends. Thus, the channel currently serving as the rest channel at the time when the server-based data call ends may be the same channel that was serving as the rest channel before the subscriber unit tuned to the second channel to transmit its server-based data call, or it may be a different channel. Upon receipt of the identity of the channel currently serving as the rest channel, the subscriber unit may leave the second channel and tune to the channel currently serving as the rest channel, if the subscriber unit becomes idle after the server-based data call ends. If the subscriber unit receives additional information (e.g., a status message of at least one other channel in the system) when the server-based data call ends, the subscriber unit may leave the second channel and tune to a channel where a call of interest is active.

As mentioned above, the channel currently serving as the rest channel may change often. Let us now describe how a new channel is selected to serve as the rest channel for the system. In order for a new channel to be selected to serve as the rest channel, all repeaters must first have knowledge of the state of the other channels in the system. To obtain this knowledge, when a repeater powers-on, the repeater registers its presence with a master repeater for the system and may do so using one of any number of known methods. Until a repeater successfully registers with the master repeater, the repeater may function as a single repeater n-channel trunked system, where n is the number of channels being hosted by that repeater.

To begin functioning as a single repeater n-channel trunked system, the repeater selects one of its channels to serve as the rest channel for the system and the status of the other channels on the repeater are set to "idle". The repeater broadcasts the identity of the channel serving as the rest channel. The broadcast of the identity of the channel serving as the rest channel also informs the subscriber units of the presence of the repeater. Optionally, the repeater may also broadcast the status of at least one channel over all of its channels. This procedure is followed by the repeaters that power-on when the master repeater is not available (e.g., due to a device, networking, or communication link failure) or if the repeater is serving as the master repeater, and no other repeaters have yet registered with it.

Upon a successful registration by a repeater with the master repeater, the master repeater may provide the state and UDP/

IPv4 addresses of all the registered repeaters in the system to the repeater, and also may provide the state and UDP/IPv4 address of the repeater to all the registered repeaters in the system. Each of the repeaters in the system use the provided information to exchange the status of their channels (e.g., unusable, idle, rest, busy) with each other throughout the course of operation of the trunked system. In this case, when a channel is busy, the exchanged information may additionally comprise the type of call (e.g., group call, individual call, voice call, data call) or the target identifier/call's destination ID (i.e., the identity of the group or individual who is to receive the call). The exchanged information is used by the repeater in at least two situations, including the selection of a new channel to serve as the rest channel for the system and the formation of messages which are broadcast to subscriber units informing them of the state of at least one of the channels in the system.

Let us first discuss the first situation in which the exchanged information is used by the repeaters in greater detail: the selection of a new channel to serve as the rest channel for the system. In one embodiment, in a two-way RF communication system having at least one repeater, a plurality of channels, and a plurality of subscriber units, a repeater hosts a first channel that is currently serving as a rest channel for the system. Again, the channel currently serving as the rest channel for the system is being monitored by subscriber units that are idle in the system. At some point, the repeater determines to select a new channel to serve as the rest channel for the system, and makes a further determination as to whether there is at least one eligible channel to serve as the rest channel for the system.

A channel is considered eligible to serve as the rest channel for the system when the hardware and/or software for the repeater hosting the channel is operational, when the hardware and/or software for the repeater hosting the channel is enabled, or when the repeater hosting the channel does not detect interference. If no interference is detected and all hardware and/or software is deemed to be in an operable and enabled condition, then other repeaters, if present and in communication with the system, are informed that the channels hosted by the repeater are eligible to serve as the rest channel for the system. Conversely, if any hardware and/or software failure is detected such that a repeater is in a disabled or inoperable condition or if interference is detected, then the channels hosted by the repeater are deemed ineligible to serve as the rest channel, and all the other repeaters are informed of such. In systems that employ a pool of "data-only" channels (as described above), the "data-only" channels are not eligible to serve as the rest channel.

When a channel is deemed to be either in an eligible or ineligible condition, the repeaters in the system continually run a series of tests for determining interference presence and hardware and/or software operability of a repeater in order to determine if a channel remains in either an eligible or ineligible condition. In one embodiment, since each of the repeaters in the system are interconnected using a backhaul network, such as a LAN connection or the like, all repeaters can be informed of the status for determining if a specific channel remains eligible or ineligible to serve as the rest channel.

Therefore, if a repeater is inoperable or disabled, all channels hosted by that repeater are taken out of service. In the case of interference, since the interference typically affects all of the channels in that section of radio spectrum, such as a physical radio channel, those channels in that spectrum affected by the detected interference are also taken out of service. If the repeater, however, experiences some type of failure, then all channels being hosted by that repeater are taken out of service. In the case of repeater failure, this one event disables all of the channels hosted by the repeater.

If there is at least one eligible channel in the system, the repeater selects the new channel to serve as the rest channel from one of the eligible channels in the system. Once the new channel is selected to serve as the rest channel for the system, its identity is broadcasted to the subscriber units monitoring the first channel. The identity of the new channel that is selected to serve as the rest channel for the system may also be broadcasted to the subscriber units monitoring any of the other channels hosted by the repeater, and to at least one other repeater, if other repeaters are present in the system.

It is advantageous for the new channel that is selected to serve as the rest channel for the system to be selected from one of the eligible channels that is currently idle in the system, however, it is not necessary. If, however, all the channels that are eligible to serve as the rest channel are busy, then, in one embodiment, if the channel currently serving as the rest channel is eligible, it continues to serve as the rest channel in addition to, for example, transmitting the call. In other words, for example, when a call starts on the first channel currently serving as the rest channel, and there are no channels that are idle in the system that are eligible to serve as the rest channel for the system, then the repeater does not select a new channel to serve as the rest channel, and the subscriber units that are idle in the system continue to monitor the first channel, but do not participate in the call being transmitted on the first channel. Thus, under these conditions, the first channel plays dual roles as both the rest channel and a busy traffic channel (i.e., a busy rest channel).

Meanwhile, if a channel becomes idle that is eligible to serve as the rest channel, then that channel is selected to serve as the rest channel for the system. The repeater hosting the busy rest channel informs the repeater that is hosting the eligible channel that just became idle that it is now hosting the channel that is serving as the rest channel. The repeater hosting the busy rest channel also informs the subscriber units monitoring the busy rest channel of the channel that is currently serving as the rest channel for the system. As a result, the subscriber units that are not participating in the call may then tune to the channel currently serving as the rest channel.

There may be various reasons for determining to select a new channel to serve as the rest channel for the system. Some example reasons may be, but not limited to, a new call starting on the channel currently serving as the rest channel, the repeater hosting the channel currently serving as the rest channel has failed, the repeater hosting the channel currently serving as the rest channel has become disabled, the repeater hosting the channel currently serving as the rest channel has detected interference, or the like. It should be noted that interference can be detected on the repeater's uplink channel, downlink channel, or both. When the repeater hosting the channel currently serving as the rest channel fails, becomes disabled, or detects interference, the channel is no longer eligible to serve as the rest channel; moreover, if any of these conditions occur, a new channel is selected to serve as the rest channel, however, in the event that the repeater hosting the rest channel fails, the repeater hosting the channel currently serving as the rest channel is unable to select the new channel to serve as the rest channel. In this case, at least one of the other repeaters in the system selects the new rest channel to serve as the rest channel. When the repeater determines that the failure has been corrected, enabled, or no longer detects interference on the channel, the channel regains eligibility to serve as the rest channel for the system again. If the system comprises more than one repeater, the repeater informs at least a second repeater that its channels are eligible to serve as the rest channel for the system again.

In an alternative embodiment, instead of automatically selecting a new channel to serve as a rest channel when a new call is initiated, the repeater may determine if the new call will be less than a predetermined duration. If the new call will be less than the predetermined duration, the repeater does not select a new rest channel to serve as the rest channel, thus allowing the subscriber units that are idle in the system to remain on the channel during the new call. The repeater determines the duration of the call by determining the type of call being transmitted, and based on the type of call being transmitted, it can infer the duration of the call or decode information supplied by the transmitting device to determine the duration of the call. Some examples are, but not limited to, (1) when the Data Type field indicates CSBK, the duration of the call is known to be one burst since CSBKs are always only one burst in accordance with the ETSI-DMR standard; (2) when the "Blocks to Follow" field in the standard ETSI-DMR data header or multiple block CSBK (MBC) header indicate how many blocks of data will follow; (3) when the CSBK Blocks to Follow field in the standard ETSI-DMR preamble CSBK message indicates how many blocks will follow; (4) when the Data Type field indicates privacy indication (PI) header or voice link control (LC) header, the subscriber unit assumes a voice call that is longer than the predetermined duration; or (5) when the Data Type field indicates a MBC continuation (without previously receiving a MBC Header), Rate ½ Data (without previously receiving a Data Header), Rate ¾ Data (without previously receiving a Data Header), or Rate 1 Data (without previously receiving a Data Header), the repeater assumes a non-voice call that is longer than the predetermined duration. A person of ordinary skill in the art will readily understand, in view of the present disclosure, that the subscriber unit can be provisioned to make any assumptions regarding the expected duration of a particular type of call.

If the new call is assumed to be less than a predetermined duration, then the channel carrying the new call continues to serve as the rest channel. The subscriber units that are idle in the system may continue to monitor the channel; however, a particular subscriber unit will not participate in the call if the call is not of interest to the subscriber unit. If, however, the call is not assumed to be less than the predetermined duration, the repeater attempts to select a new channel to serve as the rest channel at step 409. If the duration of the new call is not known or cannot be determined a priori, the repeater may assume that the call is not less than the predetermined duration and attempt to select a new channel to serve as the rest channel for the system. As an example, the predetermined duration may be set at 500 msec. in some systems. In another example, the predetermined duration may be set at 0 seconds.

Moving on, it is important that a subscriber unit is able to detect when the repeater hosting the channel currently serving as the rest channel fails, becomes disabled, or detects interference without notification from the repeater that a new channel has been selected to serve as the rest channel. As such, the subscriber unit may need to independently determine that a new channel has been selected to serve as the rest channel.

One way the subscriber unit independently determines that a new channel has been selected to serve as the rest channel is as follows. In operation, the repeater hosting the channel currently serving as the rest channel periodically broadcasts a "beacon" message on the channel serving as the rest channel, where the beacon message may simply identify the channel currently serving as the rest channel. If a subscriber unit does not receive a predetermined number, n, of consecutive beacons on the channel currently serving as the rest channel within an expected time period, then it determines that either the repeater has failed, been disabled, or detected interference, and thus, it is no longer monitoring the channel currently serving as the rest channel for the system, or it is not in a coverage area of the repeater. In one embodiment, the beacon period is set to one second and n is set to two. Failing to receive n consecutive beacons triggers the subscriber unit to begin a search for the new channel currently serving as the rest channel using known channel scanning techniques. Each subscriber unit that is idle in the system, however, may search for the new channel currently serving as the rest channel at approximately the same time. Since some search procedures may involve waking up a repeater, the transmission of subscriber units searching for the channel currently serving as the rest channel may collide. To reduce the probability of collision, a subscriber unit delays its search by a random time, and all the repeaters wake up and transmit at least the identity of the channel currently serving as the rest channel for a short duration upon determining that the repeater hosting the channel currently serving as the rest channel has failed, been disabled or detected interference, thus making the channel currently serving as the rest channel ineligible to continue serving as the rest channel.

Additionally, there may be instances when the subscriber unit not only has to independently determine that a new channel has been selected to serve as the rest channel, but also has to independently search and find the channel currently serving as the rest channel. Details of how the subscriber unit may independently search for and find the new channel currently serving as the rest channel is described in co-pending U.S. Ser. No. 12/331,189, titled "Method of Efficiently Synchronizing to a Desired Timeslot in a Time Division Multiple Access Communication System", developed by and assigned to Motorola, Inc.

Using one of the synchronization pattern methods as described in co-pending U.S. application Ser. No. 12/331, 189, the channel currently serving as the rest channel for the system carries a rest channel synchronization pattern that is mutually exclusive from all other synchronization patterns being carried on other channels in the system, for example, standard ETSI-DMR synchronization patterns are used on other channels in the system (i.e., channels that are not currently serving as the rest channel). It is important to note that when a channel is serving as the rest channel, it carries the rest channel synchronization pattern; however, when the same channel is no longer serving as the rest channel, it no longer carries the rest channel synchronization pattern, but rather a synchronization patterns being carried by the other channels in the system (i.e., the channels that are not currently serving as the rest channel). Thus, when the subscriber unit is searching for the channel currently serving as the rest channel, it searches for the rest channel synchronization pattern, which is only being carried by the channel currently serving as the rest channel. Once the rest channel synchronization pattern is detected, the subscriber unit immediately synchronizes to the channel since it knows with a high degree of certainty that it found the channel currently serving as the rest channel. Once synchronized, the subscriber unit determines if any other synchronization patterns are received (e.g., standard ETSI-DMR) which may indicate a new call is starting on the channel or the system has selected yet a different channel to serve as the rest channel. This method of identifying a specific channel (i.e., frequency and timeslot) is very quick and useful in conventional channel scanning applications.

Figure 6:
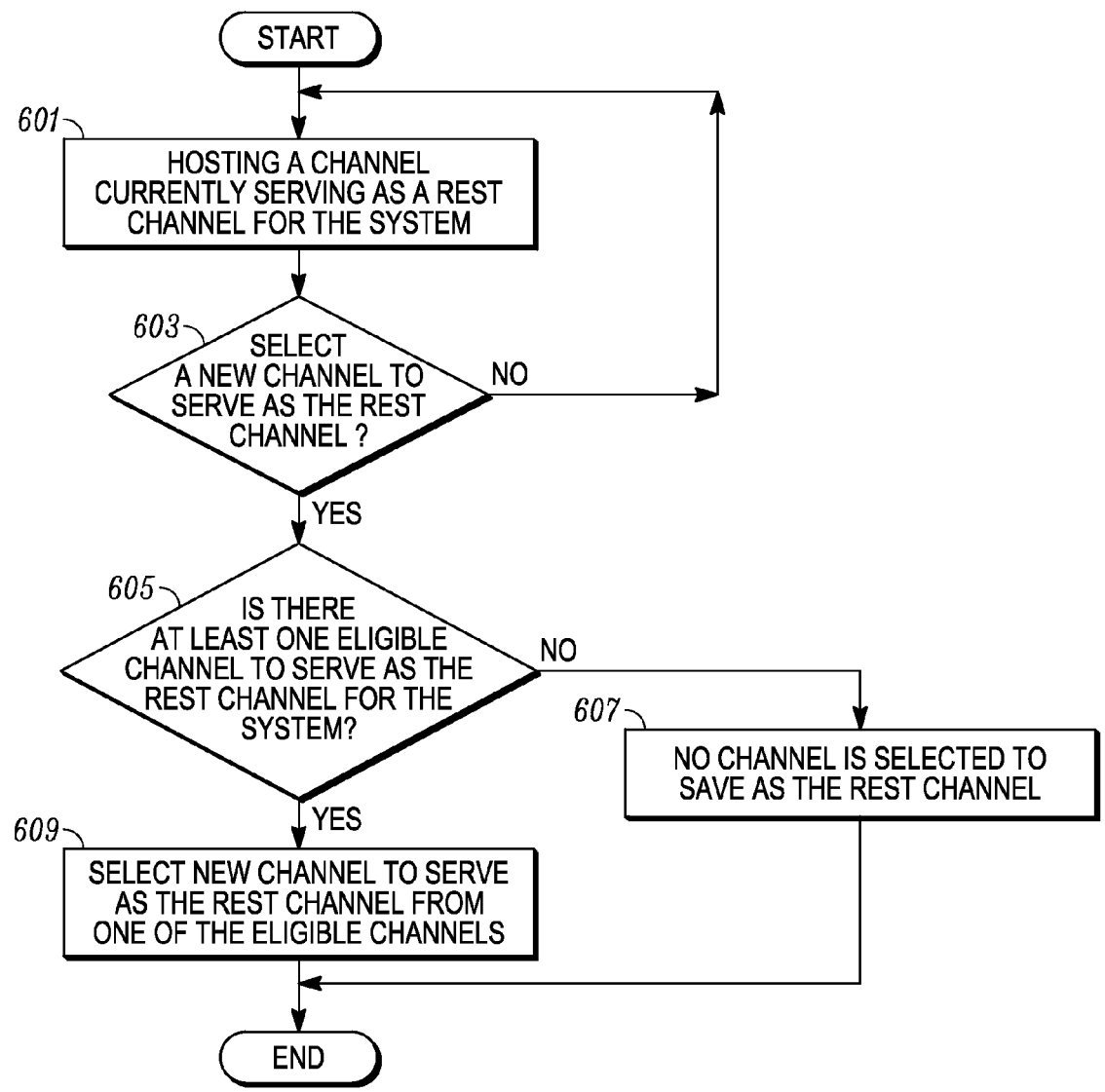
FIG. 6 is a flowchart illustrating a process used for selecting a channel to serve as a rest channel in a radio communications system in accordance with an embodiment of the present disclosure.

FIG. 6 is a flowchart diagram illustrating a process used for selecting a new channel to serve as the rest channel in a two-way RF communications system having at least one repeater, a plurality of channels and a plurality of subscriber units. The process begins at a first repeater hosting a channel that is currently serving as the rest channel for the system at step 601. As described above, the channel currently serving as the rest channel for the system is monitored by subscriber units that are idle in the system. At some point, the repeater (typically the repeater hosting the channel currently serving as the rest channel) determines that a new channel needs to be selected to serve as the rest channel 603. A new channel to serve as the rest channel may be needed if, for example, a new call starts on the channel currently serving as the rest channel (i.e., the channel becomes busy), the repeater hosting the channel currently serving as the rest channel detects interference, the repeater hosting the channel currently serving as the rest channel malfunctions or experiences a failure, or the repeater hosting the channel currently serving as the rest channel is disabled by the system operator. It is important to note that a busy channel is still eligible to serve as the rest channel for the system, as in the first example. In the latter three examples, however, the channels hosted by those repeaters become ineligible to serve as the rest channel; once the repeater determines that the condition that caused the need for a new channel to serve as the rest channel has been corrected (e.g., interference is no longer present on the channel, the failure on the repeater has been corrected, or the repeater is enabled), it informs at least a second repeater that its channels are eligible to serve as the rest channel for the system again.

Once the repeater determines to select a new channel to serve as the rest channel at step 603, then a further determination is made as to whether there is at least one eligible channel in the system to serve as the rest channel at step 605. If there are no eligible channels in the system, then the process ends without a new channel being selected to serve as the rest channel at step 607. When an eligible channel becomes available, it becomes the rest channel for the system.

If there is at least one eligible channel to serve as the rest channel in the system at step 605, the repeater selects the new channel to serve as the rest channel from one of the eligible channels at step 609. The repeater at least broadcasts the identity of the new channel that will serve as the rest channel to the subscriber units monitoring the channel currently serving as the rest channel. The repeater may also broadcast the identity of the new channel that will serve as the rest channel to the subscriber units on other channels hosted by the repeater. The repeater may further broadcast the identity of the new channel that will serve as the rest channel to at least a second repeater, if present in the system.

It is advantageous, but not necessary, to have a channel that is idle to serve as the rest channel. Thus, in one embodiment, if a repeater hosting the channel currently serving as the rest channel is also hosting a second channel that is idle and is eligible to serve as the rest channel for the system, the repeater may select the second channel it is hosting to serve as the rest channel before considering selecting a different channel from one of the eligible channels as the new channel to serve as the rest channel. In another embodiment, a repeater may attempt to select the new channel to serve as the rest channel from one of the eligible channels that are idle before considering selecting the new channel to serve as the rest channel from one of the eligible channels that are busy. In yet another embodiment, if there is more than one eligible channel that is idle, a repeater may select the new channel to serve as the rest channel based on, at least in part, an amount of interference expected on each of the eligible channels that are idle, or may select the new channel to serve as the rest channel based on, at least in part, a ranking assigned to the plurality of eligible channels that are idle. For example, the repeaters may have a predefined ranking of channels in order of preference for serving as the rest channel (e.g., a channel with no co-channel repeaters may be the channel most preferred to serve as the rest channel while a channel with a highly active co-channel repeater may be the channel least preferred to serve as the rest channel).

Even though it is advantageous to select a channel that is idle to serve as the rest channel, it may not always be possible. Thus, if there is at least one eligible channel in the system, but none of the eligible channels are idle, the repeater may select an eligible channel that is busy as the new channel serving as the rest channel. Eventually, when an eligible channel becomes idle in the system, the repeater hosting the current channel serving as the rest channel that is busy may select the eligible channel that became idle to serve as the rest channel. In one embodiment, if there are no eligible channels that are idle in the system, and if the channel currently serving as the rest channel is eligible, the channel currently serving as the rest channel may continue to serve as the rest channel (i.e., the most preferred busy channel). In another embodiment, if there are a plurality of eligible channels in the system, but none of the eligible channels are idle, a repeater may select the new channel to serve as the rest channel based on, at least in part, an amount of interference expected and/or measured on each of the eligible channels, or may select the new channel to serve as the rest channel based on, at least in part, a ranking assigned to each of the eligible channels that are busy.

It is also advantageous, but not necessary, for there to only be one channel serving as the rest channel for the system at any given time. There may be, however, more than one channel serving as the rest channel for the system, for example, in the following situation. During the course of operation of a trunked communication system, the backend network used for inter-repeater communications may be disrupted or fail. In this situation, a first group comprising one or more repeaters may become isolated from a second group comprising one or more repeaters, thereby creating a bifurcated network. When this occurs, some subscriber units may be tuned to a channel currently serving as a rest channel that is hosted by a repeater in the first group while other subscriber units may be tuned to a channel currently serving as a rest channel that is hosted by a repeater in the second group. One reason why this may occur is if the system, prior to the bifurcation, had only one rest channel, the rest channel is either hosted by a repeater belonging to the first group or the second group, and consequentially, one group of repeaters and subscriber units is left without a rest channel. As a result, the group of repeaters that do not have a channel serving as a rest channel selects a channel to serve as the rest channel from amongst the channels belonging to their group. Once the channel to serve as the rest channel has been selected, the system operates as two independent trunked systems, each with their own rest channel. A person of ordinary skill in the art will readily understand that the system can bifurcate into more than two groups, and still remain within the spirit and scope of the present invention.

Depending on how the system is designed, once the backend network is fully operational again, and the system is operating as a single trunked system again, the plurality of channels serving as rest channels that resulted when the system was bifurcated may remain, or the repeaters hosting a channel serving as one of the rest channels may select a single channel to serve as the rest channel for the system based on known election techniques. For example, one such method is to pre-assign each of the channels in the system a unique numeric identifier, and when multiple rest channels are detected, select the channel among the multiple rest channels with the lowest valued (or highest value) identifier to serve as the rest channel for the system. It should be noted that any number of methods may be used to elect a single channel to serve as the rest channel for the system from the multiplicity of channels serving as a rest channel. Thus, when a repeater determines that there is more than one channel serving as the rest channel, in one embodiment, one of the channels is selected to serve as the rest channel for the system, and the repeater hosting the other channel serving as a rest channel changes its status to a "regular" channel (i.e., not a "rest" channel) that is idle in the system; the repeater further broadcasts the new status of its channel to all of the repeaters in the system, and instructs all the subscriber units that are idle and tuned to the channel they believe is the rest channel to tune to the channel that was selected to serve as the rest channel for the system.

Figure 7:
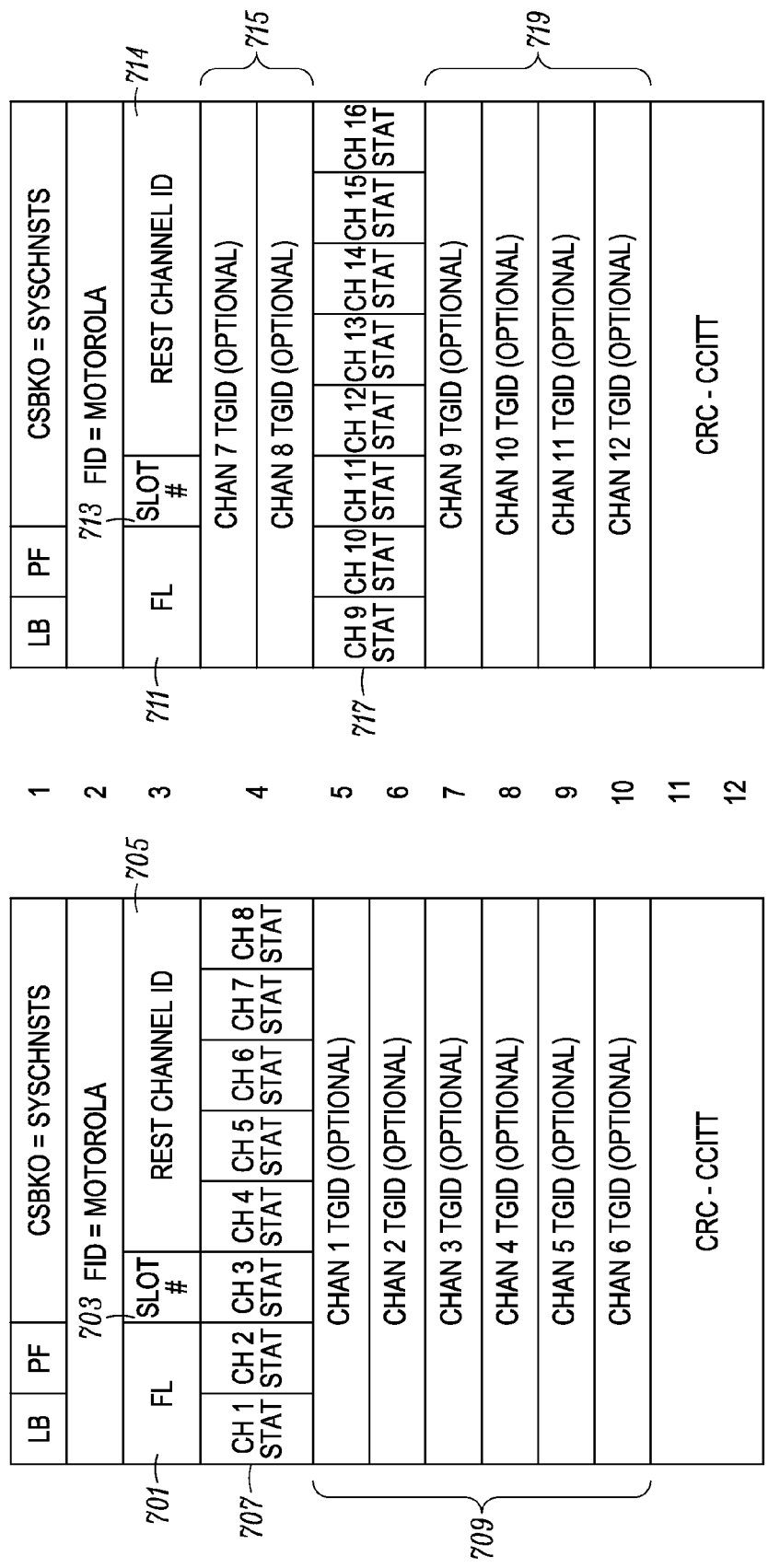
FIG. 7 illustrates a diagram of an example of a status message as used in providing system status to a subscriber unit in accordance with an embodiment of the present disclosure.

Let us now discuss the second situation in which the exchanged information is used by the repeaters in greater detail: the formation of status messages (e.g., a CSBK message) which are broadcast to subscriber units informing them of the state of at least one of the channels in the system. FIG. 7 illustrates an example of a first status message that is broadcast to the subscriber units while the channel is idle. The status message broadcasted while the channel is idle may comprise the status of one channel in the system, all the channels in the system, or any number of channels in between. As noted herein, the status message is used to communicate information to subscriber units regarding the current state of the system. The first status message illustrated in FIG. 7 is an example of the message transmitted on the channel serving as the rest channel, if idle. Repeaters that are transmitting, but have one or more channels that are idle, may continuously transmit this status message on the channels that are idle. The information may include, but is not limited to, the following: the channel currently serving as the rest channel for the system; the status (e.g., rest, idle, busy, disabled, interference detected, malfunctioned, etc.) of every channel in the system, and for every busy channel, the target identifier (e.g., identity of the talkgroup or individual subscriber unit) using the channel; the status of the channels having an active call along with the target identifier, or the like.

The general format of a CSBK message is defined in the ETSI-DMR standard as comprising twelve octets with the format of the first two octets and last two octets being defined by the standard. Being defined in the ETSI-DMR standard, the first two octets and last two octets will not be discussed herein. The status message can be transmitted as a single burst or a multi-burst message. FIG. 7 illustrates an example of a two-burst status message. To facilitate a variable length status message, the status message may include a first/last field (FL) 701 that functions similar to the link control start/stop (LCSS) information element defined in the ETSI-DMR standard. The status message also may include a slot number field 703, which may be used to identify in which timeslot the status message is transmitted (applicable to a TDMA system). A rest channel ID field 705 identifies which channel in the system is currently serving as the rest channel. Further, octet 4 includes 1-bit of status information for eight system channels 707, allowing each channel to be identified as being busy or idle. For each channel identified as being busy in the eight system channels 707, a subsequent octet is included in the status message to further identify the identity of the target identifier currently using the channel 709. FIG. 7 shows octets 5-10 containing six channel talkgroup identifiers 709, which would be the case if channels 1-6 were busy with talkgroup calls. If more than six channels are busy with talkgroup calls, then another octet of channel information, similar to octet 4, 707, would be introduced followed again by an appropriate number of target identifiers corresponding to each busy channel.

The second burst, illustrated in FIG. 7, has the same format as the first burst. The third octet comprises a FL 711, a slot number 713, and the rest channel ID field 714. Octets 4 and 5, 715, comprises talkgroup identifiers for channels 7 and 8, 707, which would be the case if channels 7 and 8 were busy with talkgroup calls. Octet 6, 717, comprises another 1-bit of status information for eight system channels. Octets 7-10, 719, comprise four talkgroup identifiers, which would be the case if channels 9-12 were busy with talkgroup calls. Multiple bursts are concatenated together until all of the channels in the system have been reported in the status message. Thus, the status message has an adaptable format that comprises fields for talkgroup identifiers for only the busy channels which allows the status of the system to be communicated with a minimal number of bursts. This improves the signaling efficiency and reduces latency.

Figure 8:
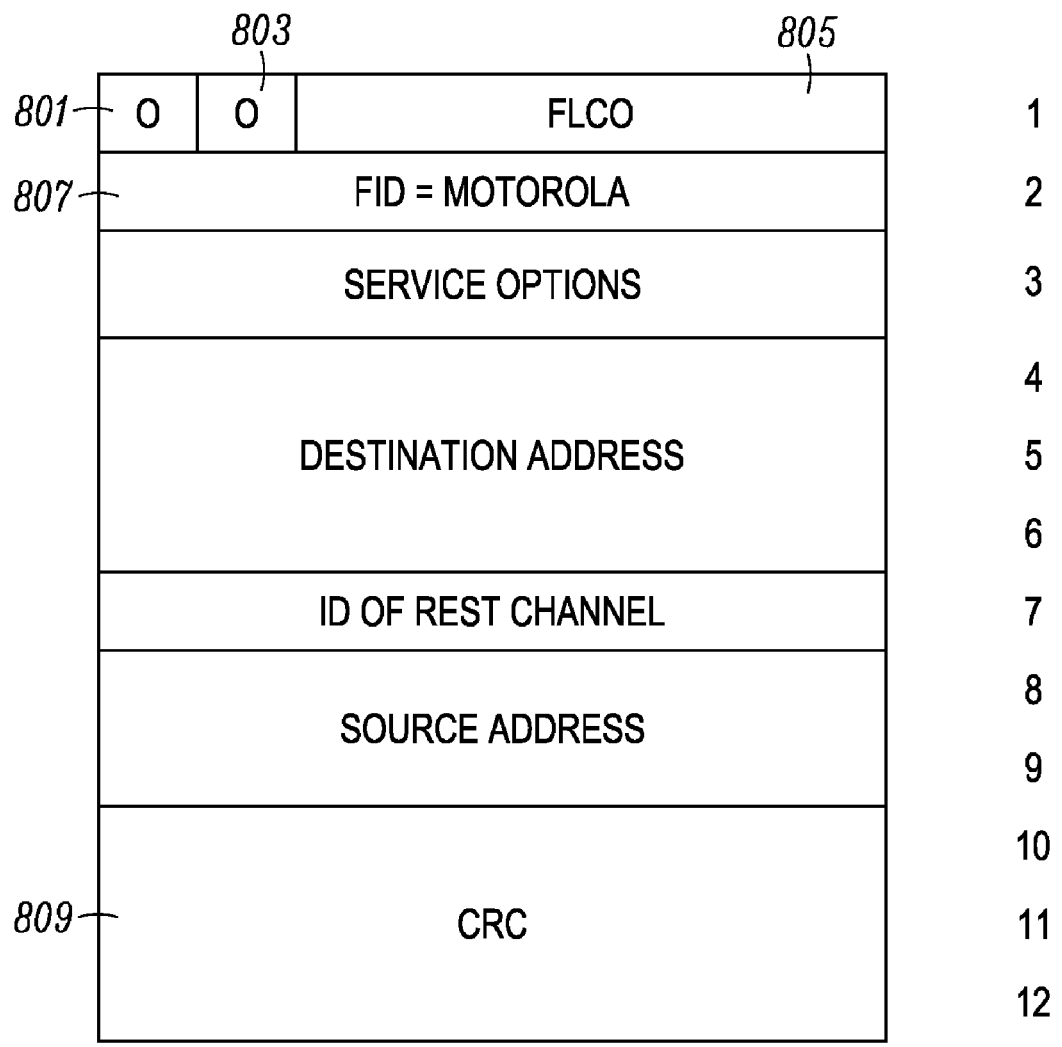
FIG. 8 illustrates a diagram of an example of a link control message as used with a rest channel identifier in accordance with an embodiment of the present disclosure.

FIG. 8 is an example of a full link control (LC) message as used with the rest channel ID field. The 9-octet LC message format is defined by the ETSI-DMR standard and is primarily used to identify call type and addressing. The two full LCs presently defined in the ETSI-DMR standard are group voice channel user LC and unit-to-unit voice channel user LC. According to the ETSI-DMR standard, the full LCs can appear in standalone bursts with the 24-bit CRC as shown or embedded within voice calls with a 5-bit checksum (not shown). The ETSI-DMR standard defines the format of the first two octets, which will not be discussed herein. Further, the full LC with rest channel ID shown in FIG. 8 is identical in format and function to the two full LCs presently defined in the ETSI-DMR standard with the following exceptions. The source address field is shortened from 24-bits to 16-bits, resulting in the source address occupying octets 8 and 9. Octet 7 identifies the current rest channel ID. Because of this customization of the LC format, the feature set identifier (FID) is set to identify the message as a message format proprietary to Motorola, Inc. This LC format is used for voice LC header, embedded LC, and terminator with LC and is embedded only in voice calls. By including a rest channel ID in the full LC, the system can identify the new channel to serve as the rest channel of the system at the beginning of a new call (e.g., by placing in the voice LC header) and can identify the channel currently serving as the rest channel of the system (e.g., by placing in the embedded LC or terminator with LC). Those skilled in the art will recognize that the general format for the LC illustrated in FIG. 8, specifically fields 801, 803, 805, 807 and 809, are defined by ETSI-DMR standard.

Figure 9:
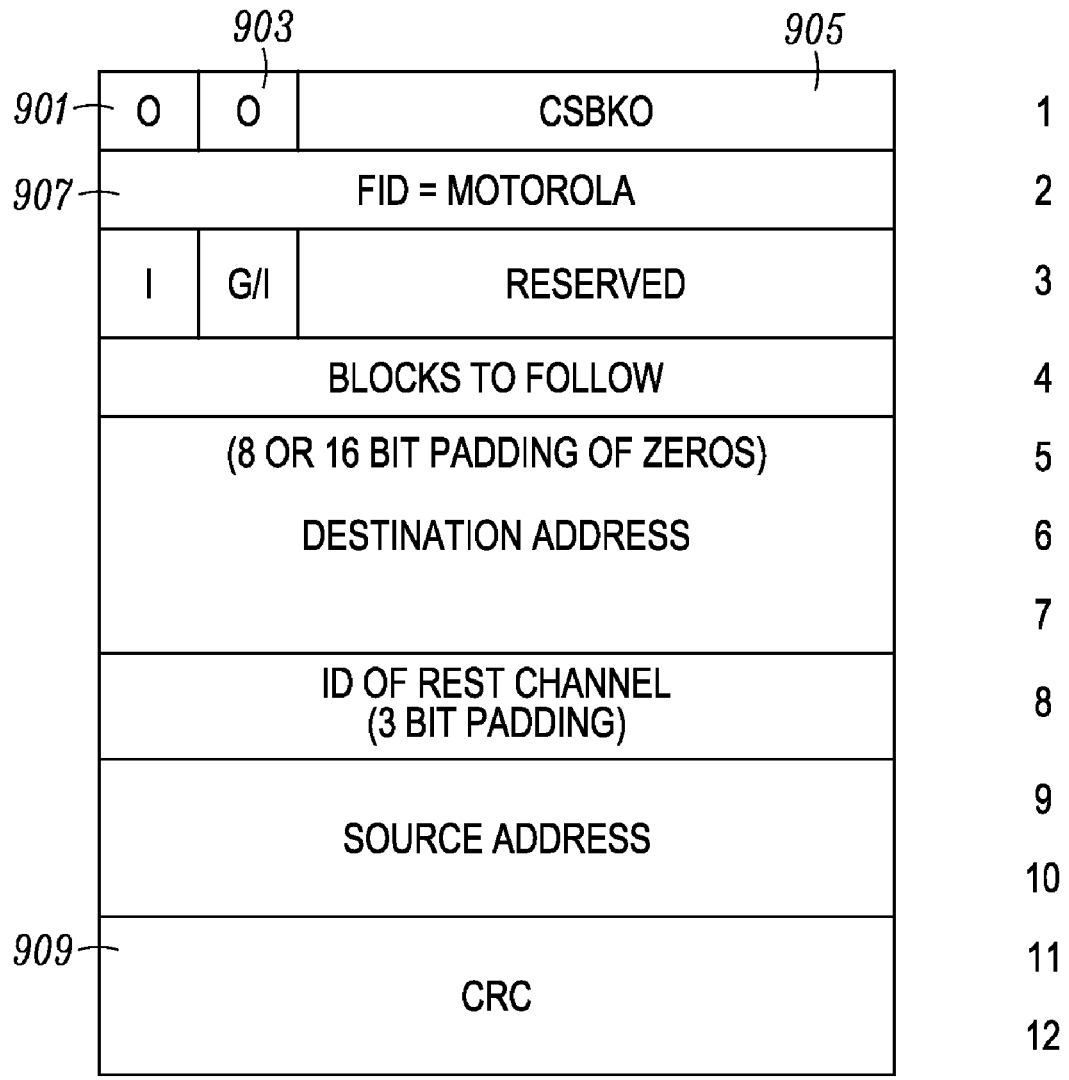
FIG. 9 illustrates an example of a preamble control signaling block (CSBK) as used with a rest channel identifier in accordance with an embodiment of the present disclosure.

FIG. 9 is an example of a preamble CSBK that is used in connection with the rest channel ID for data transmissions. As noted above, the general format of the CSBK message is defined by the ETSI-DMR standard. One specific type of CSBK presently defined in the ETSI-DMR standard is the preamble CSBK, which may precede other CSBKs and also may precede any data transmissions. An example of a preamble CSBK shown in FIG. 9 is similar in format and function to the preamble CSBK defined in the ETSI-DMR standard with the following exceptions. The source address field is shortened from 24-bits to 16-bits resulting in the source address occupying octets 9 and 10. Octet 8 identifies the channel ID currently serving as the rest channel. Because of this customization of the example preamble CSBK format, the FID is set to identify the message as a message format proprietary to Motorola, Inc. By including the channel ID currently serving as the rest channel in the preamble CSBK, the system can identify the new channel serving as the rest channel at the beginning of a new CSBK or data transmission. Those skilled in the art will further recognize that the general format for the CSBK, specifically fields 901, 903, 905, 907 and 909, are defined by ETSI-DMR standard.

Figure 10:
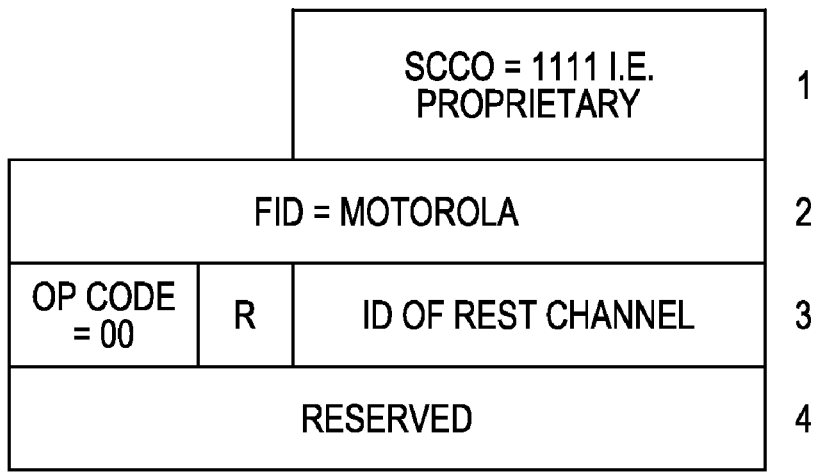
FIG. 10 illustrates an example of a rest channel message as used in accordance with an embodiment of the present disclosure.

FIG. 10 illustrates an example of a rest channel message used for informing the subscriber units of the identity of the channel currently serving as the rest channel for the system, while a channel is busy with a call. The rest channel message is similar to the general format of a CACH message, also known as a short link control PDU, as defined in the ETSI-DMR standard. The rest channel message may comprise a 4-bit short link control opcode (SLCO) in the first octet. A FID identical in format and function to the FID included in the full LC message may be used in the second octet. Because the rest channel message is not defined in the ETSI-DMR standard, the FID may be set to identify the rest channel message as a message format proprietary to Motorola, Inc. The third octet may include bits for an opcode, a reserved field, R, and a rest channel field. Finally, the fourth octet may include bits that are reserved for future use.

Figure 11:
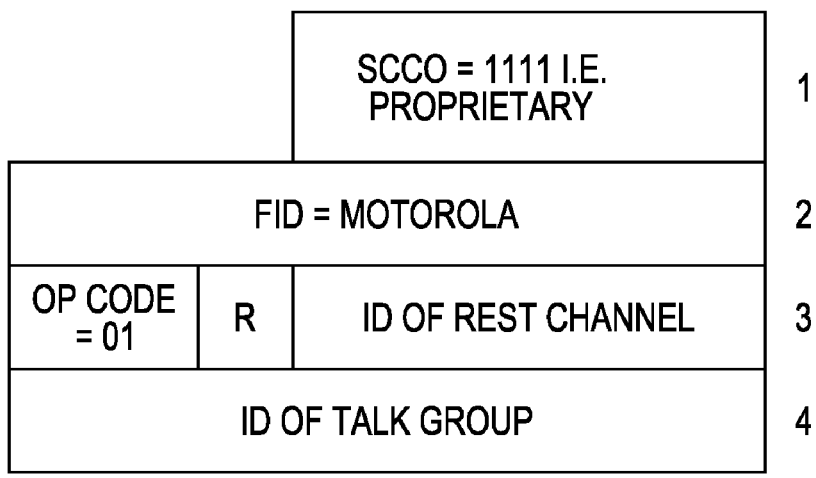
FIG. 11 illustrates an example of a status message as used in accordance with an embodiment of the present disclosure.

FIG. 11 illustrates an example of a second status message used for informing the subscriber unit of the status of a channel in the system, and the target identifier for an active call, while the channel is busy. Similar to the rest channel message described in FIG. 10, the status message may be similar to the general format of a CACH message as defined in the ETSI-DMR standard. The status message may comprise a SLCO in the first octet, and a FID, identical in format and function to the FID in the full LC message, in the second octet. Because the status message is not defined in the ETSI-DMR standard, the FID may be set to identify the status message as a message format proprietary to Motorola, Inc. The third octet may comprise bits for an opcode, reserved field, R, and a channel identification field. Finally, the fourth octet may comprise the identification of the talkgroup.

As described herein, when a new channel is selected to serve as the rest channel, subscriber units not participating in the call may be informed of the current system channel status in order to locate the new channel serving as the rest channel. Accordingly, the following messages may be transmitted to subscriber units according to the following:

(1) When the repeater hosting the rest channel is not transmitting (i.e., asleep), it may periodically wake up and transmit the first status message 700 on all of its channels;

(2) When a subscriber unit does not receive the first status message 700 for a defined period of time (the beacon interval), it may attempt to wake the repeater as part of an active site search to prompt the repeater to transmit the status message 700;

(3) Repeaters that are transmitting, but have one or more channels that are idle, may continuously transmit the first status message 700 in the channels that are idle;

(4) At the end of a call (following call hang time), the repeater may broadcast the first status message 700;

(5) When a repeater has at least one active call, the repeater may continuously transmits the channel ID for the channel currently serving as the rest channel in the rest channel message 1000; when a repeater has at least one active voice call, the repeater may continuously transmits the channel ID for the channel currently serving as the rest channel in the embedded LC message 800 for each voice call;

(6) When a channel that is idle becomes the rest channel, the repeater may broadcast the first status message 700 for a short duration (for example, 5 seconds);

(7) When the repeater wakes up and begins transmitting, it may begin its transmission with the first status message 700;

(8) When a new call is beginning, the new call may be preceded with a LC message 800 in a voice LC header burst; and (9) When a new CSBK or data call is beginning, the new call may be preceded with preamble CSBK message 900 in a CSBK burst.

Figure 12:
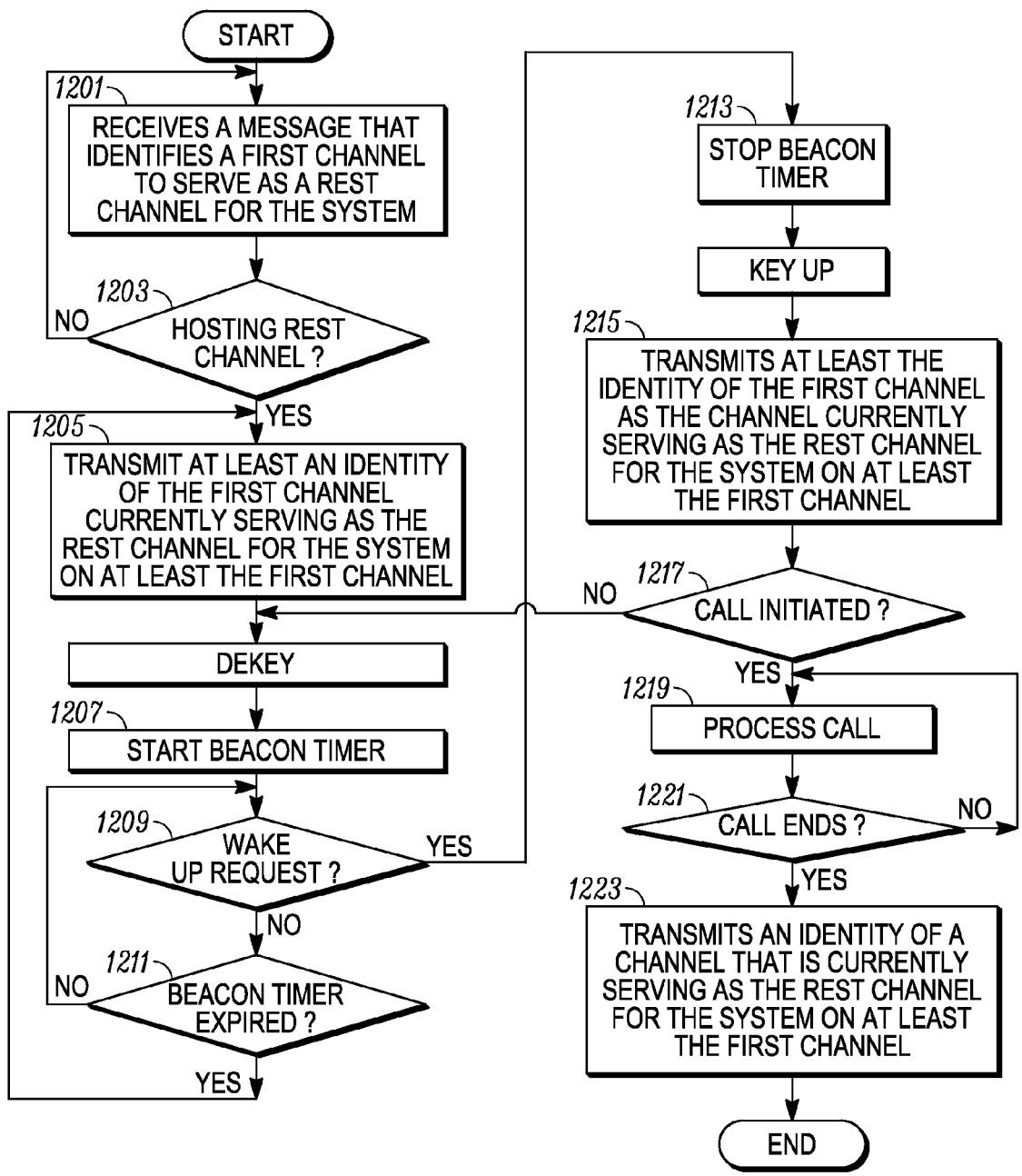
FIG. 12 is a flowchart illustrating a method for informing subscriber units of at least the channel currently serving as the rest channel in accordance with an embodiment of the present disclosure.

FIG. 12 is a flowchart illustrating a method for informing subscriber units of the channel currently serving as the rest channel for the system. The method begins with the repeater receiving the identity of a first channel that is selected to serve as the rest channel for the system as step 1201. Upon receipt, the repeater determines whether it is hosting the first channel that is selected to serve as the rest channel for the system at step 1203. If not, the repeater waits to receive a new message. If the repeater determines that it is hosting the first channel that is selected to serve as the rest channel for the system at step 1203, the repeater keys up, transmits at least the identity of the first channel serving as the rest channel for the system on the first channel, and optionally, on each channel that it hosts at step 1205, and dekeys.

After the transmission at step 1205, the repeater may start a beacon timer at step 1207. It should be noted that the repeater keys up prior to each time it transmits a message, and dekeys after it transmits the message. In other words, the repeater does not continuously transmit when it is not transporting user payload which enables the repeater to co-exist with co-channel repeaters as is typically required for co-channel users.

Once the timer is set, the repeater waits to receive a wake-up request from a subscriber unit at step 1209. The ETSI-DMR standard defines the repeater outbound activation CSBK, also commonly known as a wake-up request, and associated procedures for waking a repeater that is asleep. The repeater continues to wait until a wake-up request is received or until the beacon timer expires at step 1211, whichever is sooner. If the beacon timer expires prior to receiving a wake-up request from a subscriber unit, the repeater repeats the process starting at step 1205. If, however, a wake-up request is received prior to the beacon timer expiring, upon receipt of the wake-up request, the repeater stops the beacon timer at 1213, keys up, and transmits at least the identity of the first channel as the channel currently serving as the rest channel for the system on at least the first channel at step 1215.

Thereafter, the repeater determines whether the subscriber unit is attempting to initiate a call on the first channel at step 1217. If the repeater determines that the subscriber unit is attempting to initiate a call, the repeater processes the call until it ends at step 1219 and 1221. After the call ends, the repeater may transmit an identity of the channel currently serving as the rest channel for the system on at least the first channel. Transmitting the identity of the channel currently serving as the rest channel on the first channel allows subscriber units participating in the call to quickly learn the channel currently serving as the rest channel for the system. In some embodiments, status information of at least one channel in the system may also be transmitted to the subscriber units. For example, providing status information for channels with active calls allows the subscriber units to make a determination about which channel to tune to next (e.g., the current channel serving as the rest channel for the system or another channel carrying a call of interest).

If, however, the repeater determines that the subscriber unit is not attempting to initiate a call at step 1217, it dekeys and repeats the process starting at step 1207. The subscriber unit may have transmitted the wake-up request without attempting to initiate a call in situations where the subscriber unit needs to confirm it has detected the current channel serving as the rest channel.

As previously described, it is understood that it is critical for subscriber units that are idle to be tuned to the rest channel for the system when a subscriber unit initiates a new call. Because a repeater selects the rest channel and communicates its selection to the subscriber units and transmission latency is incurred when communicating the rest channel selection to the subscriber units, it is possible for there to be a period of time when some subscriber units believe one channel is currently serving as the rest channel for the system while, in reality, some repeaters believe a different channel is currently serving as the rest channel for the system. As mentioned, this race condition is caused by signaling latency between the repeater and subscriber units, which may result in a subscriber unit attempting to initiate a call on the wrong channel (i.e., a channel that is not currently serving as the rest channel).

For example, there is signaling latency between the time when the repeater determines a call has ended (i.e., the end of the call hangtime period) and the time that subscriber units learn that the call has ended so that they may tune to the channel serving as the rest channel or tune to a different channel that has activity of interest. An example of signaling latency occurs with the access type (AT) bit in the ETSI-DMR protocol, which indicates whether the channel is idle or busy, for a channel which is transmitted only once every 60 msec. Another example of signaling latency is that it takes approximately 27.5 msec to transmit a single CSBK message to a subscriber unit. If the subscriber unit initiates a transmission during this period of signaling latency, the subscriber unit may not be transmitting on the correct channel, and consequently the intended recipients may not be on the channel to receive the call, resulting in a breakdown in communications. Thus, a method to end a call that prevents such communication breakdowns is needed and is now described.

Figure 13A:
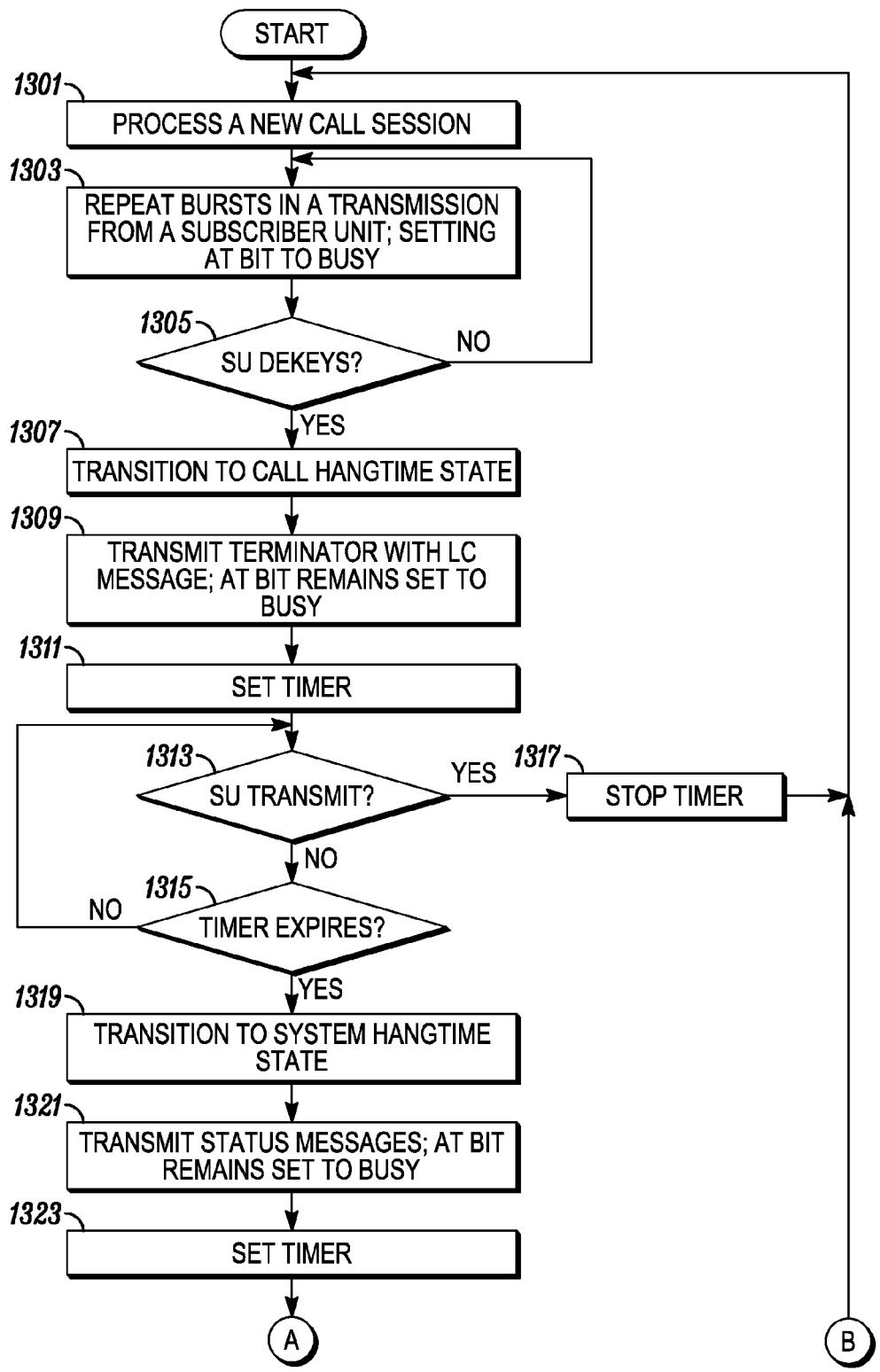
FIG. 13A/B is a flowchart illustrating a process used by a repeater for ending a call in the radio communications system in accordance with the present disclosure.
Figure 13B:
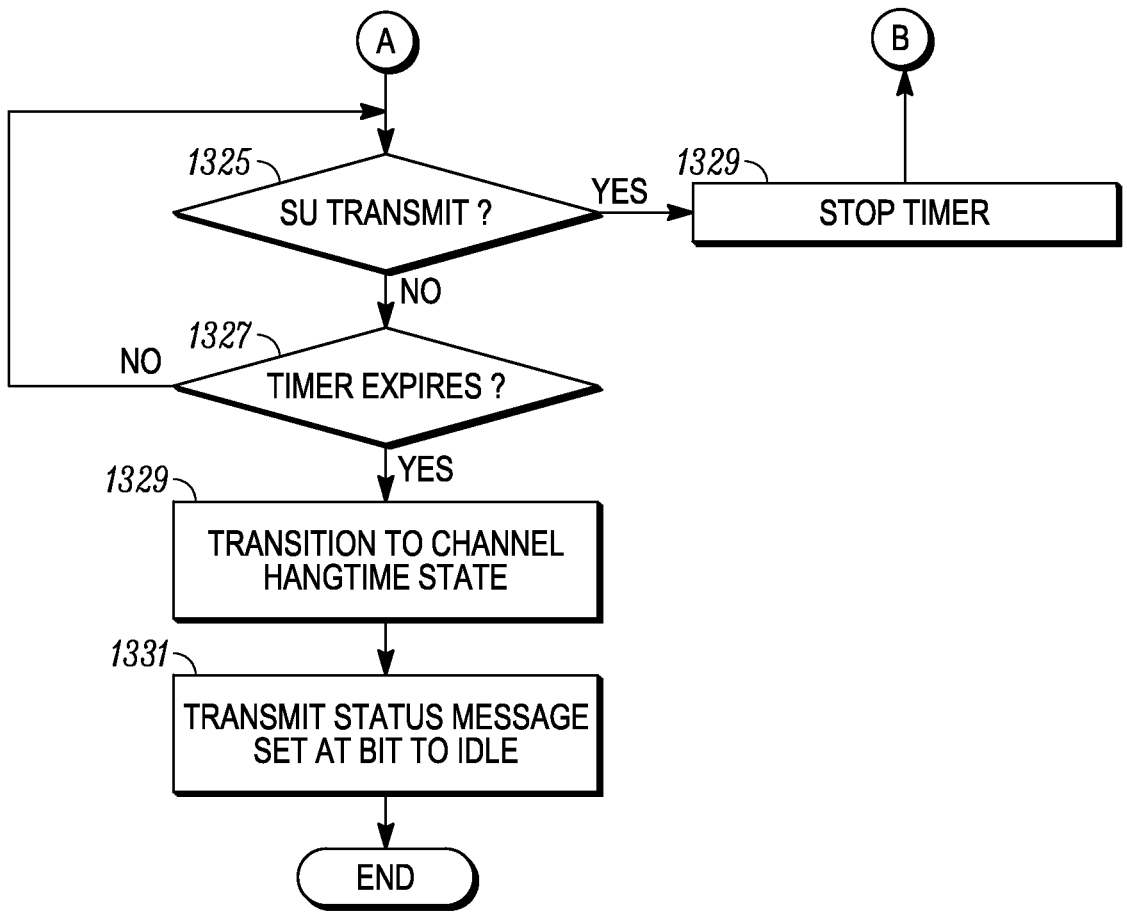

FIG. 13A/B is a flowchart illustrating the process used by a repeater for ending a call session in the radio communications system of the present disclosure. A call session comprises one or more transmissions from one or more subscriber units and at least one hangtime (i.e., the time beginning from when the repeater indicates that the channel is busy until the time when the repeater indicates that the channel is idle). The process starts with the repeater processing a new call session at step 1301. The repeater is in the process of repeating a subscriber unit's voice bursts and/or data/control bursts from a subscriber unit 1303. During this process, an AT bit is set to a value that indicates the channel is busy (e.g., set to a logical 1), in accordance with the ETSI-DMR standard. The repeater continues to repeat the subscriber unit's voice bursts and/or data/control burst until it determines that the subscriber unit has stopped transmitting or has "de-keyed" as step 1305. When the repeater detects that the subscriber unit is de-keyed, the repeater transitions the channel into a call hangtime state at step 1307, as described in the ETSI-DMR standard. The purpose of the call hangtime state is to indicate to all subscriber units monitoring the channel which users are permitted to transmit on the channel during a call hangtime period (i.e., during the call hangtime period, the channel may be reserved for the set of users that was most recently using the channel). During the call hangtime period, the repeater generates and transmits at least one terminator with LC message at step 1309, as described in the ETSI-DMR standard. While the repeater is generating the terminator with LC message, the repeater keeps the AT bit set to a value that indicates the channel is busy (e.g., set to a logical 1).

When the repeater transitions the channel into the call hangtime state at step 1307, the repeater initiates a call hangtime timer for the channel that is set for the duration of the call hangtime period which indicates the amount of time the channel remains in the call hangtime state at step 1311. As described previously, the channel transitions into a call hangtime state to reserve the channel for subscriber units that were participating in (i.e., partied to) the transmission most recently transmitted on the channel. When the AT bit is set to a value that indicates that the channel is busy, and subscriber units are provisioned with a polite channel access rule, the subscriber units that are not participating in the call session are not allowed to transmit on that channel, as described in the ETSI-DMR standard. The channel access rule is specified during system installation or commissioning by using radio service software (RSS) or customer provisioning software (CPS) provisioning within the subscriber unit. This includes a subscriber unit that is monitoring a busy rest channel as described above (i.e. the channel serves as both the rest channel and a busy traffic channel). Even if the subscriber unit is monitoring the busy rest channel, but is not participating in the call session, then the subscriber unit is not allowed to transmit when the AT bit is set to a value that indicates that the channel is busy.

Conversely, subscriber units that are participating in the call session that is active on the channel may transmit on the channel, even if the AT bit is set to a value that indicates that the channel is busy, as it is reserved for them as indicated by the contents of the terminator with LC message that is sent from the repeater to the subscriber units during the call hangtime period (step 1309).

During the call hangtime period, the repeater continually determines if it received a subscriber transmission at step 1313. If not, the repeater waits for the call hangtime timer to expire or "time out" at step 1315. If the repeater detects a new subscriber unit transmission, then the call hangtime timer is stopped at step 1317 and the process flow repeats, starting at step 1301, by processing and repeating burst from the new transmission of the subscriber unit that just keyed within the existing call session.

When the call hangtime timer expires (i.e., at the end of the call hangtime period for the channel) at step 1315, the repeater transitions the channel into a system hangtime state at step 1319, which is not described in the ETSI-DMR standard, but is disclosed herein. The purpose of the system hangtime state is to indicate to all subscriber units monitoring the channel the current state of the system so the subscriber units can make a decision about which channel to monitor at the end of a system hangtime period, and to reserve the channel as previously described for the call hangtime state. Subscriber units are not allowed to begin a transmission while the channel is in the system hangtime state, so in the event of a subscriber unit beginning a transmission during the transition from call hangtime to system hangtime, when a critical race condition could occur, the repeater may allow the transmission to begin, and the participants of the call session are still on the channel because they have not received a transition from system hangtime to channel hangtime.

During the system hangtime period, the repeater generates and transmits the first status message, as illustrated in FIG. 7, and the system keeps the AT bit set to a value that indicates the channel is busy since the channel is still reserved for the subscriber units that were participants of the most recent call session at step 1321. Again, this prevents subscriber units that were not part of the call session from transmitting during the system hangtime period.

When the repeater transitions the channel into the system hangtime state at step 1319, the repeater initiates a system hangtime timer for that channel that is set for the duration of the system hangtime period which indicates the amount of time the channel remains in the state hangtime state at step 1323. The duration of the system hangtime period is typically short; only long enough to transmit the first status message to the subscriber unit on the channel at step 1321. In one example, the system hangtime period may last only 180 msec. During the system hangtime period, the repeater continually determines if it received a subscriber transmission at step 1325. If not, the repeater waits for the system hangtime timer to expire or "time out" at step 1327. If the repeater detects a new subscriber unit transmission, then the system hangtime timer is stopped at step 1329 and the process flow repeats by processing and repeating bursts from the transmission of the subscriber unit that just keyed.

When the system hangtime timer expires or "times out" at step 1327, the repeater transitions the channel to a channel hangtime state at step 1329. The repeater may continue to transmit a status message, as illustrated in FIG. 7, but it sets the AT bit to a value that indicates the channel is idle at step 1331. The transition of the AT bit changing from a value that indicates that the channel is busy to a value that indicates that the channel is idle, while receiving at least the identity of the channel currently serving as the rest channel, and possibly status information of at least one channel in the system, is an indication that the call session has ended and this triggers the subscriber units that they may leave the channel and tune to the channel currently serving as the rest channel, or possibly, another channel containing call activity of interest. Thereafter, the process ends. Thus, during call hangtime period, the repeater identifies which group is permitted to use the channel, and during the system hangtime period, the repeater identifies the channel which is currently serving as the rest channel for the system.

The start of the channel hangtime state is signaled by the transition of the AT bit changing from a value that indicates that the channel is busy to a value that indicates that the channel is idle. Those skilled in the art will recognize that the ETSI standard specifies that during the channel hangtime period, the system or the repeater should broadcast an "idle message." In contrast to the ETSI standard, the present disclosure transmits at least the identity of the channel currently serving as the rest channel for the system, and optionally, status information for at least one other channel in the system, during the channel hangtime period so that a subscriber unit can immediately know the channel currently serving as the rest channel, and possibly the state of the system, and determine which channel it should tune to and operate on next. If the repeater detects a subscriber unit transmission during channel hangtime, the repeater may ignore the transmission by not repeating it. This is because the subscriber unit should not begin any transmissions on the channel once the channel has completed its transition from system hangtime to channel hangtime. By following the above process for ending a call session, race conditions caused by signaling delays between the repeater and subscriber units that may result in a subscriber unit initiating a call session on the wrong channel (i.e., a channel that is not the system's current rest channel) are eliminated.

Figure 14:
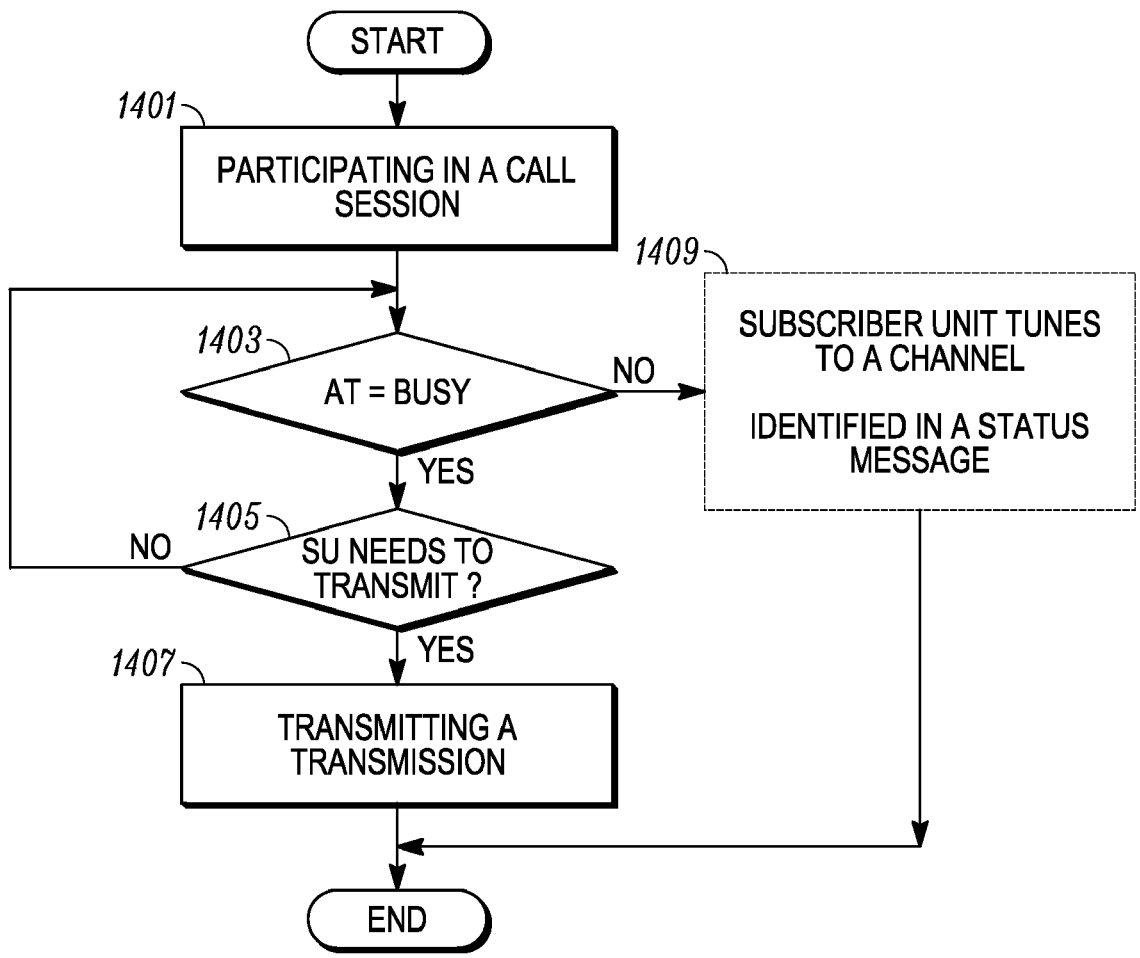
FIG. 14 is a flowchart illustrating a process used by a subscriber unit to determine when the call ends in the radio communications system in accordance with the present disclosure.

FIG. 14 is a flowchart illustrating the process used by a subscriber unit for ending a call session in the radio communications system of the present disclosure. The process starts with a subscriber unit on a traffic channel and participating in a call session at step 1401. The subscriber unit checks for an AT bit that is received approximately every 60 milliseconds for its channel. As long as the AT bit is set to a value that indicates that the channel is busy and the subscriber unit is currently participating in the call session on the channel (i.e., partied to the call), then the subscriber unit is allowed to initiate a transmission since it is on the channel and is currently participating in the call session on the channel.

Thus, the subscriber unit is continually evaluating whether it needs to initiate a transmission at step 1405. An example of this is that the subscriber unit continually determines if a user has pressed a push-to talk (PTT) switch to make a transmission. As long as no transmission request is detected, a determination is made if the AT bit is still set to a value that indicates that the channel is busy 1403 and the subscriber unit continues to participate in the call session on the channel.

If the subscriber unit needs to transmit, it begins transmitting on the channel as long as the AT bit is set to a value that indicates that the channel is busy at step 1403 and the subscriber unit is currently participating in call session on the channel at step 1407. If, however, the AT bit is set to a value that indicates that the channel is idle, then the call session is completed and the subscriber unit tunes to a desired channel. In one embodiment, the subscriber unit may receive a status message similar to one illustrated in FIG. 7 or FIG. 10 at step 1409. The desired channel may be the channel currently serving as the rest channel, or possibly, a channel that has a call of interest. Hence, when the AT bit transitions to a value that indicates that the channel is idle, the subscriber unit is no longer allowed to transmit on the channel, leaves the channel that it is currently tuned to and continues its system operations on a different channel, although in some instances the channel currently serving as the rest channel is the same as the channel that the subscriber unit is currently tuned to, in which case, the subscriber unit continues its system operations on the channel that it is currently tuned to.

It should be observed that the embodiments reside primarily in combinations of method steps and apparatus components related to a radio communications system. Accordingly, the apparatus components and method steps have been represented where appropriate by conventional symbols and flow charts in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. In a two-way radio frequency (RF) communications system having at least one repeater, a plurality of channels, and a plurality of subscriber units, a method comprising:

at a first repeater,
receiving a message that identifies a first channel that is selected to serve as a rest channel for the system, wherein a channel that is currently serving as the rest channel for the system is monitored by subscriber units that are idle in the system;
determining that the first channel selected to serve as the rest channel is hosted by the first repeater; and
periodically transmitting an identity of the first channel as the channel that is currently serving as the rest channel on at least the first channel.

2. The method of claim 1 further comprising:
keying-up the first repeater immediately prior to transmitting; and
de-keying the first repeater immediately after transmitting.

3. The method of claim 1 wherein the step of periodically transmitting comprises transmitting the identity of the first channel as the channel that is currently serving as the rest channel in a control signaling block.

4. The method of claim 1 further comprising:
receiving a wakeup request from a subscriber unit; and
transmitting at least the identity of the first channel as the channel that is currently serving as the rest channel on at least the first channel.

5. The method of claim 4 further comprising:
determining whether the subscriber unit is attempting to initiate a call on the first channel; and
if the subscriber unit is attempting to initiate the call on the first channel, processing the call on the first channel; otherwise, dekeying after the first repeater determines that the subscriber unit is not attempting to initiate the call.

6. The method of claim 5 further comprising, if the subscriber unit is attempting to initiate the call:

selecting a second channel to serve as the rest channel, wherein the second channel replaces the first channel to serve as the rest channel at the start of the call;
ceasing the step of periodically transmitting the identity of the first channel as the channel that is currently serving as the rest channel on at least the first channel; and
transmitting the identity of the second channel as the channel that is currently serving as the rest channel on at least the first channel.

7. The method of claim 6 further comprising broadcasting the identity of the second channel as the channel that is currently serving as the rest channel to at least a second repeater.

8. The method of claim 6 further comprising periodically transmitting, on at least the first channel, an identity of a channel that is currently serving as the rest channel, at least until the call ends.

9. The method of claim 8 wherein the identity of the channel that is serving as the rest channel is transmitted in a common announcement channel.

10. The method of claim 9 wherein the identity of the channel that is currently serving as the rest channel is transmitted in a short link control message.

11. The method of claim 8 wherein the identity of the channel that is currently serving as the rest channel is embedded in the call.

12. The method of claim 11 wherein the identity of the channel that is currently serving as the rest channel is embedded in a link control message.

13. The method of claim 6 further comprising, after the call ends, transmitting an identity of a channel that is currently serving as the rest channel on the first channel at a time when the call ends.

14. The method of claim 6 further comprising transmitting on each channel that is idle, and hosted by the first repeater, a status message comprising a status of at least one channel in the system until the call ends.

15. The method of claim 6 wherein the second channel is the same channel as the first channel.

16. The method of claim 1 wherein the step of periodically transmitting is performed until a second channel is selected to serve as the rest channel.

17. The method of claim 1 further comprising transmitting, on at least the first channel, a channel status for channels in the system that have an active call, and a target identifier for each active call.

18. The method of claim 1 further comprising transmitting a status message having a status of at least one channel in the system.

* * * * *